US012735272B2

(12) United States Patent
Kinugawa et al.

(10) Patent No.: US 12,735,272 B2
(45) Date of Patent: Sep. 15, 2026

(54) DEVICE FOR MANUFACTURING POWER STORAGE MODULE AND METHOD FOR MANUFACTURING POWER STORAGE MODULE

(71) Applicant: KABUSHIKI KAISHA TOYOTA JIDOSHOKKI, Kariya (JP)

(72) Inventors: Tatsuya Kinugawa, Kariya (JP); Takeharu Mori, Kariya (JP); Yuki Hiramatsu, Kariya (JP); Yoshikatsu Kawabata, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 286 days.

(21) Appl. No.: 18/702,176

(22) PCT Filed: Sep. 30, 2022

(86) PCT No.: PCT/JP2022/036808
§ 371 (c)(1),
(2) Date: Apr. 17, 2024

(87) PCT Pub. No.: WO2023/112425
PCT Pub. Date: Jun. 22, 2023

(65) Prior Publication Data

US 2025/0233188 A1 Jul. 17, 2025

(30) Foreign Application Priority Data

Dec. 14, 2021 (JP) ................................ 2021-202406

(51) Int. Cl.
*B65G 47/22* (2006.01)
*B65G 47/24* (2006.01)
(Continued)

(52) U.S. Cl.
CPC ............ *B65G 47/22* (2013.01); *B65G 47/24* (2013.01); *B65G 47/841* (2013.01);
(Continued)

(58) Field of Classification Search
CPC ...... B65G 47/22; B65G 47/24; B65G 47/841; B65G 47/843; B65G 47/90; B65G 47/905;
(Continued)

(56) References Cited

U.S. PATENT DOCUMENTS

2013/0251495 A1 9/2013 Hohenthanner et al.

FOREIGN PATENT DOCUMENTS

CN 114069015 B * 3/2024 ........ H01M 10/0413
JP 2012-018776 A 1/2012
(Continued)

OTHER PUBLICATIONS

International Preliminary Report on Patentability (with translation of Written Opinion) dated Jun. 27, 2024 issued in International Application No. PCT/JP2022/036808.
(Continued)

*Primary Examiner* — Thomas Randazzo
(74) *Attorney, Agent, or Firm* — Sughrue Mion, PLLC

(57) ABSTRACT

Power storage module manufacturing device includes a conveying device configured to convey a workpiece that is a component of a power storage module from a first device to a second device configured to stack a plurality of the workpieces, a sensor configured to detect the workpiece, and an adjustment mechanism configured to adjust a relative position of the workpiece. The conveying device includes a hand unit configured to pick up and hold the workpiece, and a moving unit configured to covey the workpiece from the first device to a stacking position on the second device by
(Continued)

moving the hand unit in a state of holding the workpiece from the first device toward the second device.

7 Claims, 13 Drawing Sheets

(51) Int. Cl.

| | |
|---|---|
| ***B65G 47/84*** | (2006.01) |
| ***B65G 47/90*** | (2006.01) |
| ***B65G 57/00*** | (2006.01) |
| ***B65G 57/02*** | (2006.01) |
| ***H01M 10/04*** | (2006.01) |

(52) U.S. Cl.
CPC ........... *B65G 47/843* (2013.01); *B65G 47/90* (2013.01); *B65G 47/905* (2013.01); *B65G 57/00* (2013.01); *B65G 57/02* (2013.01); *H01M 10/0404* (2013.01); *B65G 2201/022* (2013.01)

(58) Field of Classification Search
CPC .. B65G 57/00; B65G 57/02; B65G 2201/022; H01M 10/0404; H01M 10/0585; H01M 10/04; H01M 10/052; Y02P 70/50; H01G 11/84; H01G 13/00; Y02E 60/10
See application file for complete search history.

(56) References Cited

FOREIGN PATENT DOCUMENTS

| | | | | |
|---|---|---|---|---|
| JP | 2013-543240 A | 11/2013 | | |
| JP | 2021-166156 A | 10/2021 | | |
| JP | WO-2024257397 A1 * | 12/2024 | ............. | H01G 13/00 |

OTHER PUBLICATIONS

International Search Report for PCT/JP2022/036808 dated Nov. 8, 2022 (PCT/ISA/210).

* cited by examiner 1
10
20
23
25
31
24
23
41
24
23
25
21
23a
23b
S
31
22
13
20
52
51
15
22
21
12
22
41
14
X
Y
Z 100
107
172
185
105a
13
105
P
173a
173b
173c
173
183
186
R2
52
103
51(W1)
187
188
189
174
182
181
171
184
R1
102
X
Z
Y 100
107
172
185
105a
P
105
173a
173b
173c
173
183
186
52
103
R2
51(W1)
187
188
189
184
174
182
181
171
102
R1
Z 100
107
172
185
105a
P
105
173a
173b
173c
173
183
52
R2
51(W1)
103
187
189
188
174
182
181
171
R1
186
102
184
X
Z
Y 100
107
172
185
105a
13
105
P
173a
173b
173c
173
15(W2)
51
52
187
188
189
R2
103
174
182
181
171
183
R1
186
102
184
X
Y
Z 100
107
172
185
184
183
186
187
188
189
174
171
182
181
15(W2)
51
52
13
105a
105
P
173
173a
173b
173c
103
R2
102
R1
X
Z
Y 100
107
172
185
15(W2)
51
52
13
105a
105
187
189
188
173a
173b
173c
173
174
182
181
171
P
R2
103
183
R1
102
186
184
X
Z
Y 100
107
172
185
184
183
186
187
188
189
174
171
182
181
15(W2)
51
52
13
105a
105
173
173a
173b
173c
P
103
R2
102
R1
X
Y
Z

DEVICE FOR MANUFACTURING POWER STORAGE MODULE AND METHOD FOR MANUFACTURING POWER STORAGE MODULE

CROSS REFERENCE TO RELATED APPLICATIONS

This application is a National Stage of International Application No. PCT/JP2022/036808 filed Sep. 30, 2022, claiming priority based on Japanese Patent Application No. 2021-202406 filed Dec. 14, 2021.

TECHNICAL FIELD

The present disclosure relates to power storage module manufacturing device and power storage module manufacturing method.

BACKGROUND ART

Patent Literature 1 describes an electrode stacking device that forms a structure by stacking a positive electrode and a negative electrode with a separator interposed therebetween. The electrode stacking device includes a conveyor that conveys workpieces such as a positive electrode, a negative electrode, and a separator which are components of the structure in a longitudinal direction, and a hand device that transfers the workpieces one by one to a stacking portion and performs stacking. In addition, the electrode stacking device includes an imaging camera that images each workpiece at a position on an upstream side in a longitudinal direction of a position where each workpiece is transferred, and a control device that controls driving of the hand device based on image data acquired by imaging.

CITATION LIST

Patent Literature

Patent Literature 1: Japanese Unexamined Patent Publication No. 2012-18776

SUMMARY OF INVENTION

Technical Problem

Patent Literature 1 describes that, when a workpiece is picked up by a hand device, a transfer position of the hand device may be corrected by driving an alignment stage based on image data obtained by imaging the workpiece by an imaging camera on a conveyor. In addition, in Patent Literature 1 described above, the workpiece can be accurately stacked in the stacking portion by correcting an orientation thereof during transfer by the hand device.

However, as described above, even though the transfer position of the hand device is corrected based on the image data of the workpiece on the conveyor or the orientation is corrected when the workpiece is transferred by the hand device, there is a case where an error occurs in a stop position after a suction hand holding the workpiece is transferred to the stacking portion, and thus, there is a concern that a deviation occurs in a relative position of the workpiece with respect to the stacking portion.

An object of the present disclosure is to provide power storage module manufacturing device and power storage module manufacturing method capable of suppressing positional deviation of a workpiece at a stacking position.

Solution to Problem

Power storage module manufacturing device according to the present disclosure includes a conveying device configured to convey a workpiece that is a component of a power storage module from a first device to a second device configured to stack a plurality of the workpieces, a sensor configured to detect the workpiece, and an adjustment mechanism configured to adjust a relative position of the workpiece. The conveying device includes a hand unit configured to pick up and hold the workpiece, and a moving unit configured to covey the workpiece from the first device to a stacking position on the second device by moving the hand unit in a state of holding the workpiece from the first device toward the second device, the sensor is provided in the second device to detect the workpiece in a state of being conveyed to the stacking position and held by the hand unit, the adjustment mechanism is configured to adjust a relative position of the workpiece in a state of being held by the hand unit with respect to the second device based on a detection result of the sensor, and the hand unit is configured to dispose the workpiece of which the relative position with respect to the second device is adjusted by the adjustment mechanism in the second device.

In the power storage module manufacturing device, the workpiece which is the component of the power storage module is conveyed by moving the hand unit in a state of holding the workpiece from the first device to the stacking position on the second device that stacks a plurality of workpieces. On the other hand, in the power storage module manufacturing device, the workpiece in a state of being conveyed to the stacking position and held by the hand unit is detected by using the sensor. Then, based on the detection result of the sensor, the relative position of the workpiece in a state of being held by the hand unit with respect to the second device is adjusted, and the workpiece of which the relative position with respect to the second device is adjusted by the adjustment mechanism is disposed in the second device. Therefore, positional deviation of the workpiece at the stacking position is suppressed.

In the power storage module manufacturing device according to the present disclosure, the moving unit may include a belt driven along a conveying direction from the first device toward the second device, and the hand unit may be moved from the first device toward the second device by driving the belt. In this case, the hand unit can be moved from the first device toward the second device by driving the belt. As described above, the belt is used for driving the hand unit, and thus, a drive unit is not provided in the hand unit. Accordingly, it is possible to further reduce a weight of the hand unit and to move the hand unit at a high speed.

In the power storage module manufacturing device according to the present disclosure, the adjustment mechanism may adjust the relative position of the workpiece by adjusting a position of the hand unit with respect to the second device. In a case where the adjustment mechanism adjusts the position of the second device with respect to the hand device, the adjustment mechanism may need to drive at least a part of the second device (for example, a stage on which the workpiece is actually mounted) together with a large number of already stacked workpieces. Therefore, it is necessary to prepare an adjustment mechanism capable of driving a heavy object, and there is a concern that the device is increased in size. On the other hand, in a case where the adjustment mechanism adjusts the position of the hand unit with respect to the second device, since the adjustment mechanism may drive a relatively light material such as one workpiece and the hand unit, it is possible to avoid an increase in size of the device.

In the power storage module manufacturing device according to the present disclosure, the sensor may detect an edge of the workpiece, and the adjustment mechanism may adjust the relative position of the workpiece such that the edge of the workpiece detected by the sensor coincides with a reference position. In this case, it is possible to reliably suppress positional deviation of the workpiece at the stacking position by using the edge of the workpiece detected by the sensor.

In the power storage module manufacturing device according to the present disclosure, the hand unit may press the workpiece against the second device in a state of holding the workpiece, and the sensor may detect the workpiece in a state of being pressed against the second device. As described above, the relative position of the workpiece with respect to the second device can be more accurately detected by detecting the workpiece held by the hand unit and pressed against the second device to be extended in warpage.

In addition, power storage module manufacturing method according to the present disclosure includes a conveying step of conveying a workpiece that is a component of a power storage module from a first device toward a second device configured to stack a plurality of the workpieces. The conveying step includes a first step of picking up and holding the workpiece, a second step of conveying the workpiece in a state of being held from the first device to a stacking position on the second device after the first step, a third step of detecting a position of the workpiece in a state of being conveyed to the stacking position and held after the second step, a fourth step of adjusting a relative position of the workpiece with respect to the second device based on the detected position of the workpiece after the third step, and a fifth step of disposing the workpiece of which the relative position with respect to the second device is adjusted in the second device after the fourth step.

In the power storage module manufacturing method, a workpiece which is a component of the power storage module is conveyed by moving the workpiece from the first device to a stacking position on the second device that stacks a plurality of workpieces in a state of holding the workpiece. On the other hand, in the power storage module manufacturing method, the workpiece in a state of being conveyed to the stacking position and held is detected. Then, based on the detection result, the relative position of the workpiece in a state of being held with respect to the second device is adjusted, and the workpiece of which the relative position with respect to the second device is adjusted is disposed in the second device. Therefore, positional deviation of the workpiece at the stacking position is suppressed.

The power storage module manufacturing method according to the present disclosure may further include a step of pressing the workpiece in a state of being held against the second device after the second step and before the third step, and in the third step, the workpiece in the state of being pressed against the second device may be detected. In this manner, the relative position of the workpiece with respect to the second device can be more accurately detected by detecting the workpiece held and pressed against the second device to be extended in warpage.

Advantageous Effects of Invention

According to the present disclosure, it is possible to provide the power storage module manufacturing device and the power storage module manufacturing method capable of suppressing the positional deviation of the workpiece at the stacking position.

DESCRIPTION OF EMBODIMENTS

Hereinafter, an embodiment of power storage module manufacturing device and power storage module manufacturing method will be described with reference to the drawings. Note that, in the description of the drawings, the same elements or corresponding elements are denoted by the same reference signs, and redundant description may be omitted. In addition, each drawing may illustrate an orthogonal coordinate system defined by an X-axis, a Y-axis, and a Z-axis.

Figure 1:
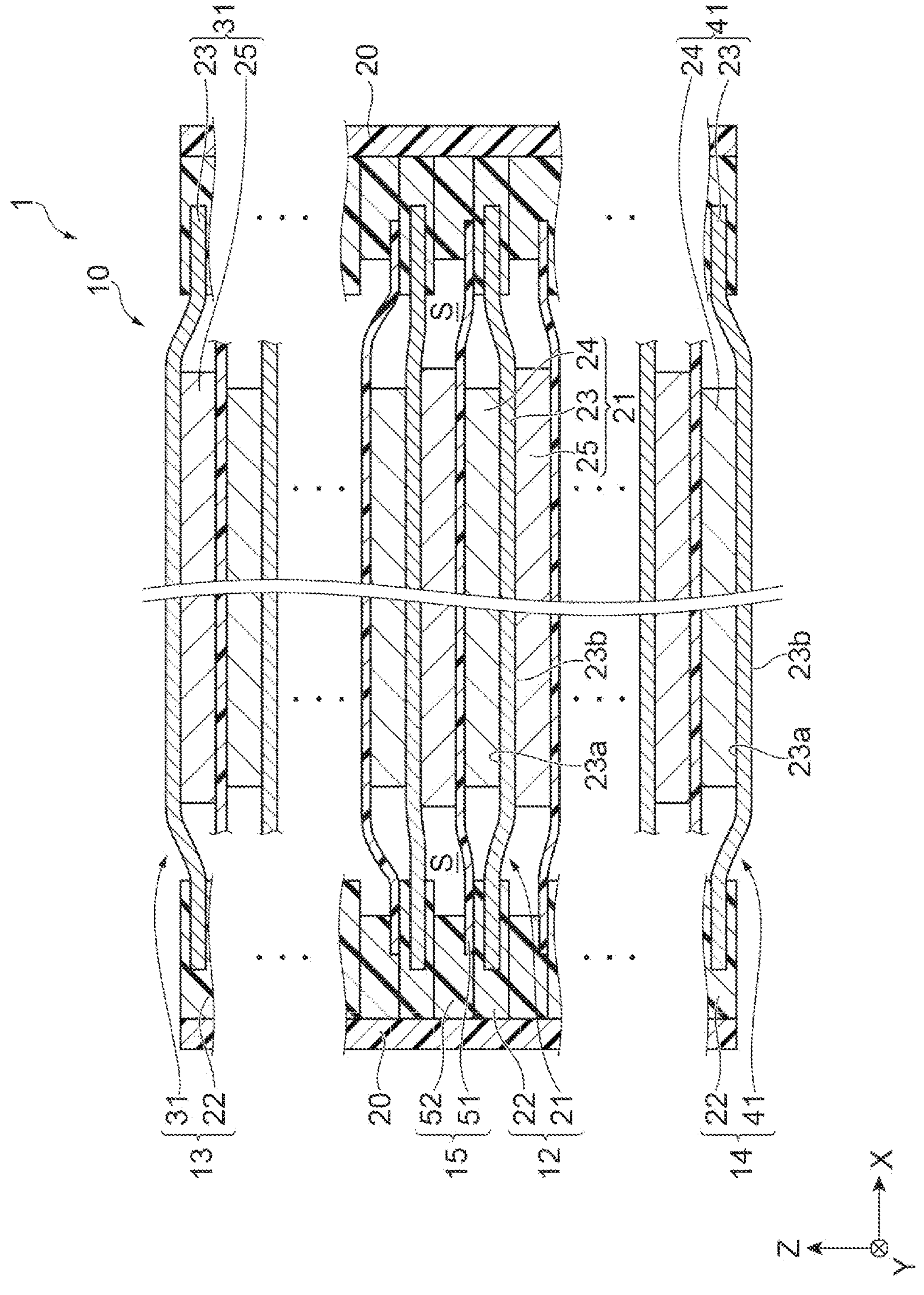
FIG. 1 is a schematic sectional view illustrating a power storage module according to the present embodiment.

FIG. 1 is a schematic sectional view illustrating a power storage module 1 according to the present embodiment. The power storage module 1 illustrated in FIG. 1 can be used for batteries of various vehicles such as forklift trucks, hybrid vehicles, and electric vehicles. The power storage module 1 is, for example, a secondary battery such as a nickel-hydrogen secondary battery or a lithium-ion secondary battery. The power storage module 1 may be an electric double-layer capacitor or an all-solid-state battery. In the present embodiment, a case where the power storage module 1 is the lithium-ion secondary battery will be illustrated.

As illustrated in FIG. 1, the power storage module 1 includes a stacked body 10 and a sealing body 20. The stacked body 10 includes a plurality of electrode units 12, one electrode unit 13, one electrode unit 14, and a plurality of separator units 15. The stacked body 10 has, for example, a rectangular parallelepiped shape as a whole. The stacked body 10 is formed by stacking the electrode units 12, 13, and 14 (hereinafter, may be simply referred to as the "electrode units") and the separator unit 15 along a Z-axis direction.

Each electrode unit 12 includes a bipolar electrode 21 and a sealing member 22. The plurality of electrode units 12 are stacked along the Z-axis direction such that a positive electrode active material layer 24 of one electrode unit 12 and a negative electrode active material layer 25 of another electrode unit 12 face each other. That is, the Z-axis direction is a stacking direction of the electrode units 12 in the stacked body 10. In addition, an X-axis direction and a Y-axis direction are two directions intersecting (orthogonal to) the stacking direction. Each bipolar electrode 21 includes a current collector 23, a positive electrode active material layer 24, and a negative electrode active material layer 25.

The current collector 23 has, for example, a sheet shape, and has, for example, a rectangular shape as viewed from the Z-axis direction. The current collector 23 has one surface 23*a* facing one side in the Z-axis direction and the other surface 23*b* facing the other side in the Z-axis direction. The current collector 23 is a chemically inactive electric conductor for continuously flowing a current through the positive electrode active material layer 24 and the negative electrode active material layer 25 during discharge or charge of the lithium-ion secondary battery. A material of the current collector 23 is, for example, a metal material, a conductive resin material, a conductive inorganic material, or the like. Examples of the conductive resin material include a resin obtained by adding a conductive filler to a conductive polymer material or a non-conductive polymer material as necessary. The current collector 23 may include a plurality of layers. In this case, each layer of the current collector 23 may contain the above-described metal material or conductive resin material.

A covering layer may be formed on a surface of the current collector 23. The covering layer may be formed by a known method such as plating or spray coating. The current collector 23 may have, for example, a plate shape, a foil shape (for example, metal foil), a film shape, a mesh shape, or the like. Examples of the metal foil include an aluminum foil, a copper foil, a nickel foil, a titanium foil, and a stainless steel foil. Examples of the stainless steel foil include SUS304, SUS316, and SUS301 defined in JIS G 4305:2015. Mechanical strength of the current collector 23 can be secured by using a stainless steel foil as the current collector 23. The current collector 23 may be formed by integrating a metal alloy foil or a plurality of metal foils. In a case where the current collector 23 has a foil shape, a thickness of the current collector 23 may be, for example, 1 μm to 100 μm.

The positive electrode active material layer 24 is provided on one surface 23*a* of the current collector 23. The positive electrode active material layer 24 has, for example, a rectangular shape as viewed from the Z-axis direction. The positive electrode active material layer 24 contains a positive electrode active material capable of occluding and releasing charge carriers such as lithium ions. Examples of the positive electrode active material include a lithium composite metal oxide having a stratified rock salt type structure, a metal oxide having a spinel structure, and a polyanionic compound. The positive electrode active material may be any material that can be used for the lithium-ion secondary battery. The positive electrode active material layer 24 may contain a plurality of positive electrode active materials. In the present embodiment, the positive electrode active material layer 24 contains olivine type lithium iron phosphate ($LiFePO_4$) as a composite oxide.

The negative electrode active material layer 25 is provided on the other surface 23*b* of the current collector 23. The negative electrode active material layer 25 has, for example, a rectangular shape as viewed from the Z-axis direction. The negative electrode active material layer 25 is slightly larger than the positive electrode active material layer 24 as viewed from the Z-axis direction. That is, in plan view viewed from the Z-axis direction, the entire formation region of the positive electrode active material layer 24 is positioned in a formation region of the negative electrode active material layer 25. The bipolar electrodes 21 are stacked along the Z-axis direction such that the positive electrode active material layer 24 and the negative electrode active material layer 25 face each other.

The negative electrode active material layer 25 contains a negative electrode active material capable of occluding and releasing charge carriers such as lithium ions. The negative electrode active material may be a simple substance, an alloy, or a compound. Examples of the negative electrode active material include Li, carbon, and a metal compound. The negative electrode active material may be an element that can be alloyed with lithium, a compound thereof, or the like. Examples of the carbon include natural graphite, artificial graphite, hard carbon (non-graphitizing carbon), and soft carbon (graphitizing carbon). Examples of the artificial graphite include highly oriented graphite and meso-carbon microbeads. Examples of the element that can be alloyed with lithium include silicon and tin. In the present embodiment, the negative electrode active material layer 25 contains graphite as a carbon-based material.

The sealing member 22 of the electrode unit 12 is joined to one surface 23*a* and the other surface 23*b* of the current collector 23 at a peripheral edge portion of the current collector 23 in the bipolar electrode 21. Note that, the sealing member 22 may be joined to at least one of one surface 23*a* and the other surface 23*b* of the current collector 23. The sealing member 22 has a frame shape surrounding the active material layer as viewed from a thickness direction of the current collector 23. As viewed from the Z-axis direction, an outer edge of the sealing member 22 is positioned outside an outer edge of the current collector 23, and an inner edge of the sealing member 22 is positioned inside the outer edge of the current collector 23.

The electrode unit 13 includes a negative electrode terminal electrode 31 and a sealing member 22. The negative electrode terminal electrode 31 includes a current collector 23 and a negative electrode active material layer 25. The negative electrode terminal electrode 31 does not have the positive electrode active material layer 24. That is, the active material layer is not provided on one surface 23*a* of the current collector 23 of the negative electrode terminal electrode 31. One surface 23*a* of the current collector 23 of the negative electrode terminal electrode 31 is exposed. The electrode unit 13 is disposed at one end of the stacked body 10 in the Z-axis direction. The electrode unit 13 is stacked on the electrode unit 12 such that the negative electrode active material layer 25 faces the positive electrode active material layer 24 of the electrode unit 12.

The sealing member 22 of the electrode unit 13 is joined to one surface 23*a* and the other surface 23*b* of the current collector 23 at the peripheral portion of the current collector 23 in the negative electrode terminal electrode 31. Note that, the sealing member 22 may be joined to at least one of one surface 23*a* and the other surface 23*b* of the current collector 23. The sealing member 22 has a frame shape surrounding the active material layer as viewed from a thickness direction of the current collector 23. As viewed from the Z-axis direction, an outer edge of the sealing member 22 is positioned outside an outer edge of the current collector 23, and an inner edge of the sealing member 22 is positioned inside the outer edge of the current collector 23.

The electrode unit 14 includes a positive electrode terminal electrode 41 and a sealing member 22. The positive electrode terminal electrode 41 includes a current collector 23 and a positive electrode active material layer 24. The positive electrode terminal electrode 41 does not have the negative electrode active material layer 25. That is, the active material layer is not provided on the other surface 23*b* of the current collector 23 of the positive electrode terminal electrode 41. The other surface 23*b* of the current collector 23 of the positive electrode terminal electrode 41 is exposed. The electrode unit 14 is disposed at the other end of the stacked body 10 in the Z-axis direction. The electrode unit 14 is stacked on the electrode unit 12 such that the positive electrode active material layer 24 faces the negative electrode active material layer 25 of the electrode unit 12.

The sealing member 22 of the electrode unit 14 is joined to one surface 23*a* and the other surface 23*b* of the current collector 23 at the peripheral portion of the current collector 23 in the positive electrode terminal electrode 41. Note that, the sealing member 22 may be joined to at least one of one surface 23*a* and the other surface 23*b* of the current collector 23. The sealing member 22 has a frame shape surrounding the active material layer as viewed from a thickness direction of the current collector 23. As viewed from the Z-axis direction, an outer edge of the sealing member 22 is positioned outside an outer edge of the current collector 23, and an inner edge of the sealing member 22 is positioned inside the outer edge of the current collector 23.

Each of the positive electrode active material layer 24 and the negative electrode active material layer 25 (hereinafter, also simply referred to as the "active material layer") may further contain a conductive aid, a binder, an electrolyte (polymer matrix, ion conductive polymer, electrolytic solution, or the like) for enhancing electric conductivity, a supporting electrolyte (lithium salt) for enhancing ion conductivity, and the like as necessary. The conductive aid is added to enhance the conductivity of each of the bipolar electrodes 21, the negative electrode terminal electrode 31, and the positive electrode terminal electrode 41. The conductive aid is, for example, acetylene black, carbon black, graphite, or the like.

Components contained in the active material layer or a compounding ratio of the components and a thickness of the active material layer are not particularly limited, and conventionally known knowledge about the lithium-ion secondary battery can be appropriately referred to. The thickness of the active material layer is, for example, 2 to 150 μm. The active material layer may be formed on the surface of the current collector 23 by a known method such as a roll coating method. A heat resistant layer may be provided on the surface (one side or both sides) of the current collector 23 or a surface of the active material layer in order to improve thermal stability of each of the bipolar electrode 21, the negative electrode terminal electrode 31, and the positive electrode terminal electrode 41. The heat resistant layer contains, for example, inorganic particles and a binder, and may further contain an additive such as a thickener.

Examples of the binder include fluorine-containing resins such as polyvinylidene fluoride, polytetrafluoroethylene, and fluororubber, thermoplastic resins such as polypropylene and polyethylene, imide resins such as polyimide and polyamideimide, alkoxysilyl group-containing resins, acrylic resins such as acrylic acid and methacrylic acid, alginates such as styrene-butadiene rubber (SBR), carboxymethyl cellulose, sodium alginate, and ammonium alginate, water-soluble cellulose ester crosslinked bodies, and starch-acrylic acid graft polymers. The binder thereof can be used alone or in combination. For example, water, N-methyl-2 pyrrolidone (NMP) or the like is used as a solvent.

The separator unit 15 includes a separator 51 and a spacer 52. The separator unit 15 is stacked between the electrode units 12 stacked on each other. In addition, the separator unit 15 is stacked between the electrode unit 12 and the electrode unit 13. Further, the separator unit 15 is stacked between the electrode unit 12 and the electrode unit 14.

The separator 51 is disposed between the adjacent bipolar electrodes 21, between the negative electrode terminal electrode 31 and the bipolar electrode 21, and between the positive electrode terminal electrode 41 and the bipolar electrode 21. An edge portion of the separator 51 is disposed between one of the adjacent sealing members 22 and the spacer 52. The separator 51 is interposed between the positive electrode active material layer 24 and the negative electrode active material layer 25. The separator 51 separates the positive electrode active material layer 24 and the negative electrode active material layer 25, and thus, charge carriers such as lithium ions pass while a short circuit due to contact between adjacent electrodes is prevented.

The separator 51 may be, for example, a porous sheet or a nonwoven fabric containing a polymer that absorbs and holds an electrolyte. Examples of a material of the separator 51 include polypropylene, polyethylene, polyolefin, polyester, and the like. The separator 51 may have a single layer structure or a multilayer structure. The multilayer structure may have, for example, a ceramic layer or the like as an adhesive layer or a heat resistant layer. The separator 51 may be impregnated with an electrolyte. The separator 51 may be made of an electrolyte such as a polymer electrolyte or an inorganic electrolyte. Examples of the electrolyte with which the separator 51 is impregnated include a liquid electrolyte (electrolytic solution) containing a nonaqueous solvent and an electrolyte salt dissolved in the nonaqueous solvent, or a polymer gel electrolyte containing an electrolyte held in a polymer matrix.

In a case where the separator 51 is impregnated with the electrolytic solution, a known lithium salt such as $LiClO_4$, $LiAsF_6$, $LiPF_6$, $LiBF_4$, $LiCF_3SO_3$, $LiN(FSO_2)_2$, or $LiN(CF_3SO_2)_2$ may be used as the electrolyte salt. In addition, known solvents such as cyclic carbonates, cyclic esters, chain carbonates, chain esters, and ethers may be used as the nonaqueous solvent. Note that, two or more of these known solvent materials may be used in combination.

The spacer 52 has a frame shape surrounding the active material layer as viewed in the thickness direction (Z-axis direction) of the current collector 23. The spacer 52 is disposed between the adjacent sealing members 22. Outer edges of the sealing members 22 and the spacers 52 coincide or substantially coincide with each other as viewed from the Z-axis direction. The inner edges of the sealing members 22 coincide or substantially coincide with each other as viewed from the Z-axis direction. The inner edges of the spacers 52 coincide or substantially coincide with each other as viewed from the Z-axis direction. The inner edges of the spacers 52 are positioned outside the inner edges of the sealing members 22 as viewed from the Z-axis direction. The outer edges of the spacers 52 are positioned outside the outer edges of the separators 51 as viewed from the Z-axis direction.

As will be described later, in a manufacturing process of the power storage module 1, after a step of forming the stacked body 10, the sealing members 22 and the spacers 52 are integrated to form the sealing body 20. As an example, among the sealing members 22 and the spacers 52, the outer edges of the sealing members 22 and the spacers 52 positioned outside the outer edge of the current collector 23 are melted. Accordingly, the outer edges of the sealing members 22 and the spacers 52 are welded to each other to be integrated. The sealing members 22, the spacers 52, and the sealing body 20 prevent a short circuit among the bipolar electrodes 21, the negative electrode terminal electrode 31, and the positive electrode terminal electrode 41, and seal the electrolyte disposed within a housing space S. Thus, the sealing member 22 and the spacer 52 contain an insulating material. Examples of the materials of the sealing member 22 and the spacer 52 include various resin materials such as resins such as polypropylene, polyethylene, polystyrene, ABS resin, and acrylonitrile styrene resin, and resins obtained by modifying these resins.

In the example of FIG. 1, boundaries are illustrated by solid lines between the sealing member 22 and the spacer 52 adjacent to the sealing member 22, and between end surfaces of the sealing member 22 and the spacer 52 opposite to the housing space S and the sealing body 20. However, as described above, each sealing member 22 and each spacer 52 are at least partially welded to each other. In addition, the sealing body 20 is formed by welding the outer edges of the sealing member 22 and the spacer 52 to each other. Therefore, in practice, the boundaries between the sealing member 22, the spacer 52, and the sealing body 20 may not be clearly confirmed at least partially as illustrated in the drawing.

As described above, the power storage module 1 according to the present embodiment can be used for batteries of various vehicles. Therefore, large-sized components (the electrode units 12, 13, and 14 and the separator unit 15) can be used as the components of the power storage module 1. A length of each component in the X-axis direction is, for example, 1 m or more, and a length of each component in the Y-axis direction is, for example, 1 m or more.

Figure 2:
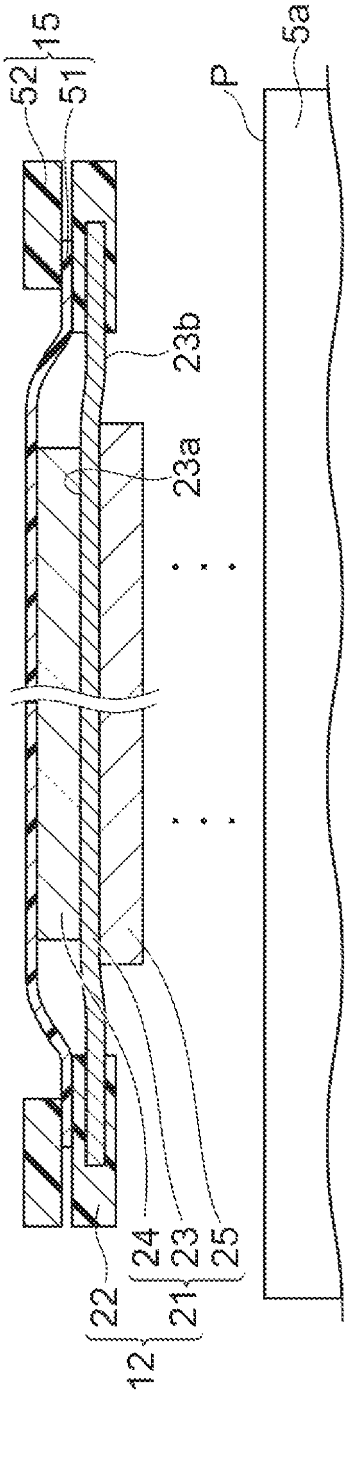
FIG. 2 is a schematic sectional view illustrating a state where an electrode unit and a separator unit illustrated in FIG. 1 are stacked.

Subsequently, the power storage module manufacturing device and the power storage module manufacturing method for manufacturing the power storage module 1 having the above-described configuration will be described. FIG. 2 is a schematic sectional view illustrating a state where the electrode unit 12 and the separator unit 15 illustrated in FIG. 1 are stacked. As illustrated in FIG. 2, in the power storage module manufacturing device and power storage module manufacturing method according to the present embodiment, first, the electrode units and the separator units 15 are alternately stacked to form the stacked body 10. More specifically, first, the electrode unit 13 (see FIG. 1) including the negative electrode terminal electrode 31 is disposed on a stacking pallet 105*a* to be described later, and the separator unit 15 is stacked on the electrode unit 13. Subsequently, the plurality of electrode units 12 and the plurality of separator units 15 are alternately stacked on the electrode unit 13 and the separator unit 15. The separator unit 15 is stacked on the electrode unit 12 disposed at an uppermost position, and the electrode unit 14 (see FIG. 1) including the positive electrode terminal electrode 41 is stacked on the separator unit 15. Accordingly, the stacked body 10 illustrated in FIG. 1 is formed.

Subsequently, a configuration of a device 100 for manufacturing a power storage module according to the present embodiment will be described.

Figure 3:
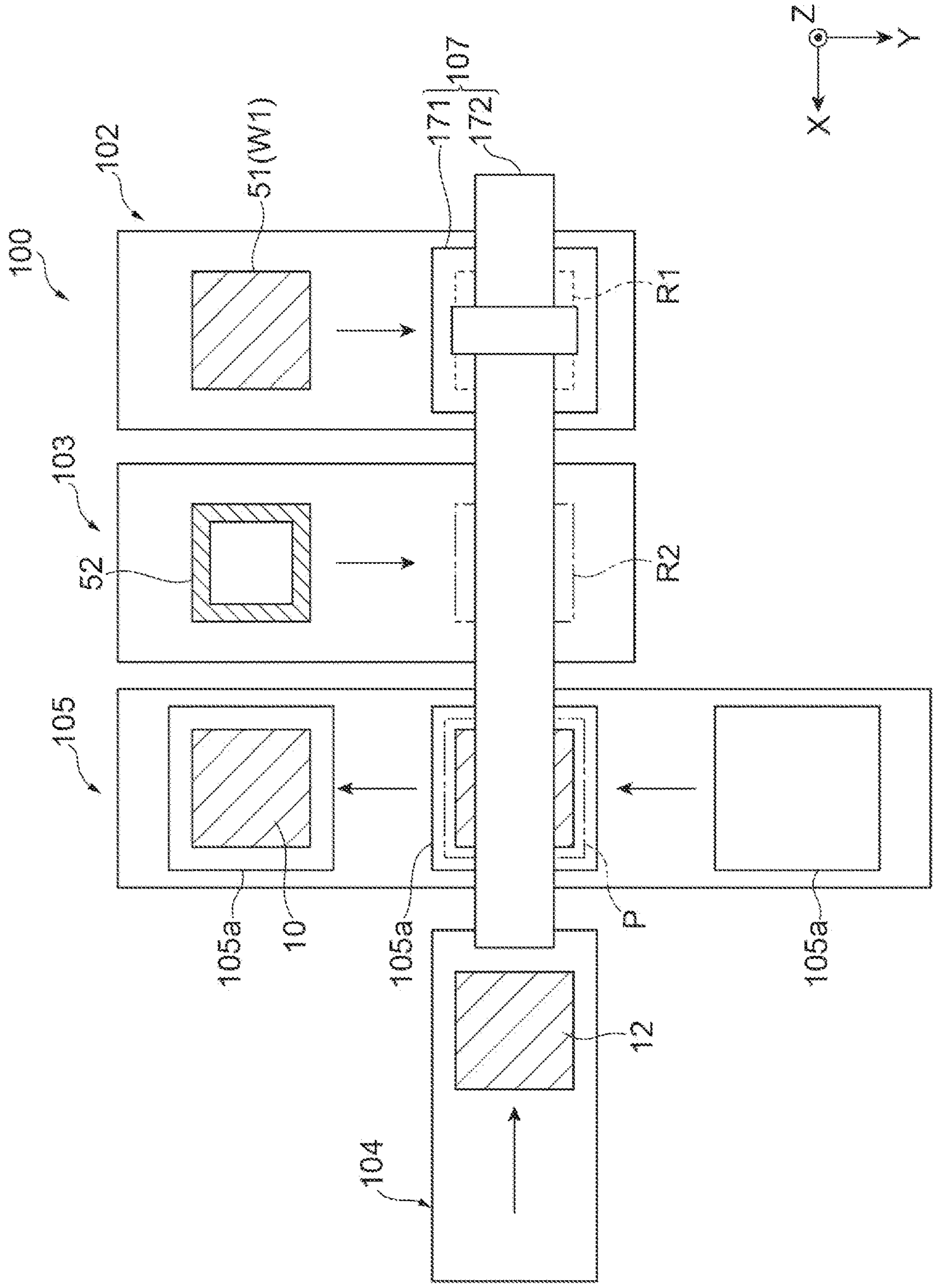
FIG. 3 is a schematic plan view illustrating a part of power storage module manufacturing device according to the present embodiment.

FIG. 3 is a schematic plan view illustrating a part of the device 100 for manufacturing a power storage module according to the present embodiment. Note that, in the following drawings, hatching is applied to the components (the stacked body 10, the electrode unit, the separator 51, and the spacer 52) of the power storage module 1 for the sake of convenience. As illustrated in FIG. 3, the device 100 for manufacturing a power storage module includes a separator supply device 102, a spacer welding device 103 (first device), an electrode supply device 104, a stacking device 105 (second device), a conveying device 107, a sensor 173, and an alignment mechanism (adjustment mechanism) 174.

The separator supply device 102 holds the plurality of separators 51 which are the components of the power storage module 1, and supplies one separator 51 to a pickup position R1 set on the separator supply device 102 at a predetermined timing.

The spacer welding device 103 holds the plurality of spacers 52 which are the components of the power storage module 1. The spacer welding device 103 supplies one spacer 52 to a pickup position R2 set on the spacer welding device 103 at a predetermined timing. The spacer welding device 103 welds the spacer 52 to the separator 51 at the pickup position R2 by a welding portion (not illustrated). That is, in the spacer welding device 103, the separator unit 15 is formed by welding the spacer 52 to the separator 51. Accordingly, the spacer welding device 103 holds the separator unit 15 at the pickup position R2. Note that, as will be described later, the separator 51 is conveyed from the separator supply device 102 to the spacer welding device 103 by the conveying device 107 to be used for welding.

The electrode supply device 104 holds the plurality of electrode units which are the components of the power storage module 1. The electrode supply device 104 supplies one electrode unit to a stacking position P set on the stacking device 105 at a predetermined timing.

The stacking device 105 is a device for stacking the electrode unit and the separator unit 15 on each other to form the stacked body 10. The stacking device 105 includes a plurality of stacking pallets 105*a*. The stacking device 105 supplies one stacking pallet 105*a* to the stacking position P at a predetermined timing. The electrode unit and the separator unit 15 are stacked on the stacking pallet 105*a* supplied to the stacking position P. The stacking device 105 takes out the stacked body 10 for each stacking pallet 105*a* at a timing when the stacked body 10 is formed on the stacking pallet 105*a*.

The pickup position R1 of the separator supply device 102, the pickup position R2 of the spacer welding device 103, and the stacking position P of the stacking device 105 are arrayed in one direction (for example, along the X-axis direction). Therefore, the conveying device 107 can convey the separator 51 to the pickup position R2 by moving a hand device 171 in the direction while picking up the separator 51 with the hand device 171 at the pickup position R1. In addition, the conveying device 107 can convey the separator unit 15 to the stacking position P by moving the hand device 171 in the direction while picking up the separator unit 15 with the hand device 171 at the pickup position R2. As described above, a conveyance object (workpiece) of the conveying device 107 is a workpiece W1 including only the separator 51 and a workpiece W2 which is the separator unit 15 including the separator 51 and the spacer 52. Next, details of the conveying device 107 will be described.

Figure 4:
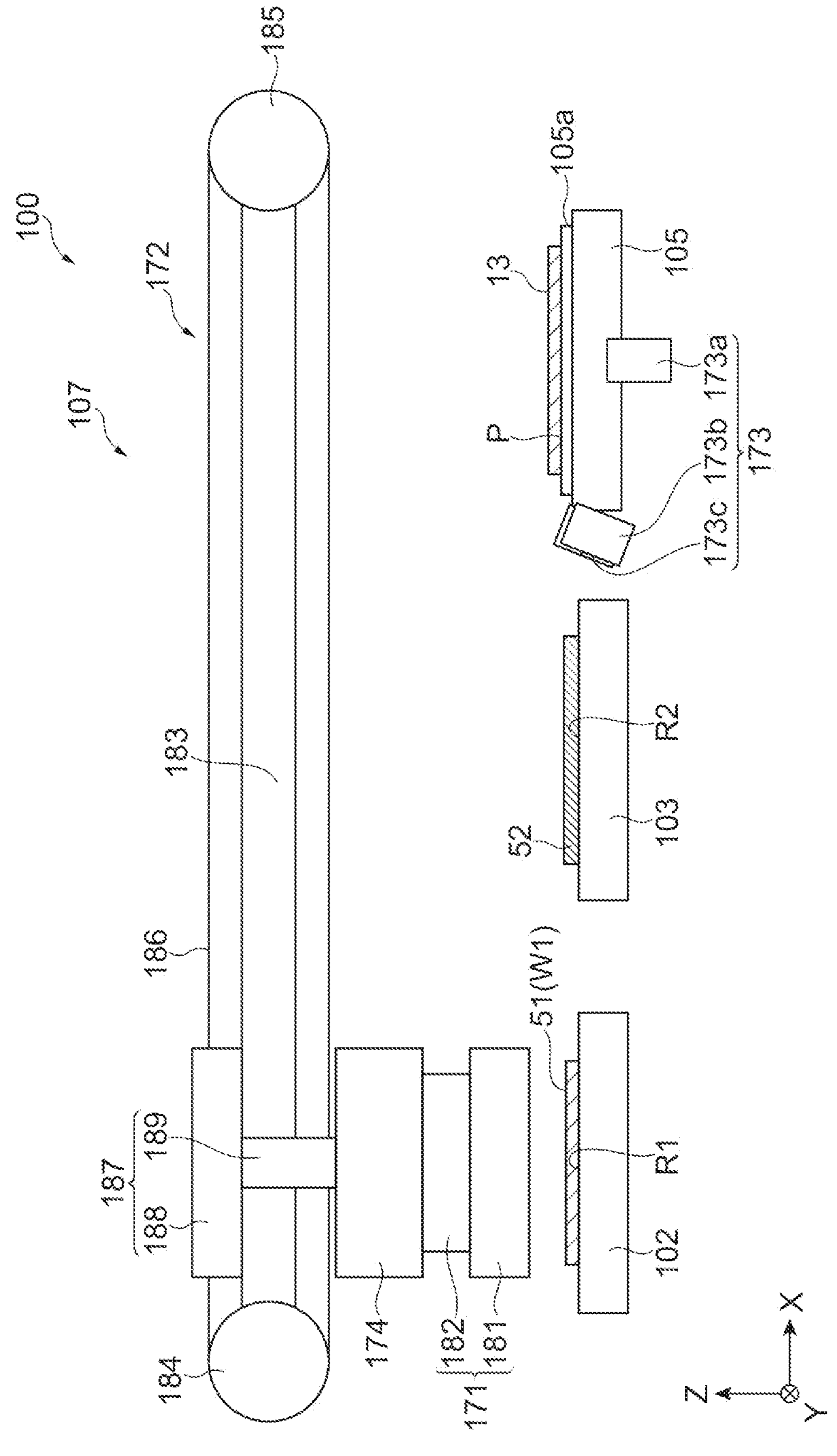
FIG. 4 is a schematic side view illustrating a part of the power storage module manufacturing device illustrated in FIG. 3.

FIG. 4 is a schematic side view illustrating a part of the device 100 for manufacturing a power storage module illustrated in FIG. 3. As illustrated in FIG. 4, the conveying device 107 includes the hand device 171 (hand unit) and a moving unit 172. The conveying device 107 is a device that conveys the workpiece W1 from the separator supply device 102 to the spacer welding device 103 and conveys the plurality of workpieces W2 from the spacer welding device 103 to the stacking device 105. Note that, in the example of FIG. 4, for the sake of convenience, a scene in which the electrode unit 13 is disposed on the stacking pallet 105*a* of the stacking device 105 is illustrated. However, as will be described later, in the present embodiment, the electrode unit 13 is not stacked on the stacking pallet 105*a* before the spacer 52 is welded to the separator 51 in the spacer welding device 103.

The hand device 171 includes a suction hand 181 and a vertical movement mechanism 182. The vertical movement mechanism 182 moves the suction hand 181 in a vertical direction (Z-axis direction). In the hand device 171, the workpieces W1 and W2 can be sucked by the suction hand 181 by lowering the suction hand 181 toward the workpieces W1 and W2 by the vertical movement mechanism 182 and bringing the suction hand 181 into contact with the workpieces W1 and W2. In addition, in the hand device 171, the workpieces W1 and W2 can be sucked and held in the air by raising the suction hand 181 by the vertical movement mechanism 182 in a state where the suction hand 181 sucks the workpieces W1 and W2.

The moving unit 172 moves the hand device 171 along an array direction (here, the X-axis direction) of the pickup position R1 of the separator supply device 102, the pickup position R2 of the spacer welding device 103, and the stacking position P of the stacking device 105. In addition, the moving unit 172 can stop the hand device 171 at a position corresponding to each of the pickup position R1, the pickup position R2, and the stacking position P.

Accordingly, the moving unit 172 can convey the workpiece W1 onto the pickup position R2 by moving the hand device 171 in a state of holding the workpiece W1 from the pickup position R1 of the separator supply device 102 toward the pickup position R2 of the spacer welding device 103. At this time, in the conveying device 107, the workpiece W1 can be disposed at the pickup position R2 by lowering the suction hand 181 by the vertical movement mechanism 182 and releasing the suction of the workpiece W1 by the suction hand 181. In addition, the moving unit 172 can convey the workpiece W2 to the stacking position P on the stacking device 105 by moving the hand device 171 in a state of holding the workpiece W2 from the pickup position R2 of the spacer welding device 103 toward the stacking position P of the stacking device 105. At this time, in the conveying device 107, the workpiece W2 can be disposed in the stacking device 105 by lowering the suction hand 181 by the vertical movement mechanism 182 and releasing the suction of the workpiece W2 by the suction hand 181.

The moving unit 172 moves the hand device 171 along one direction (X-axis direction) as described above. Thus, the moving unit 172 includes a rail 183, a pair of pulleys 184 and 185, a belt 186, and a connecting portion 187.

The rail 183 extends along the X-axis direction above (a positive side in the Z-axis direction) the separator supply device 102, the spacer welding device 103, and the stacking device 105. A length of the rail 183 is, for example, about 10 m.

The pulley 184 is disposed at one end of the rail 183, and the pulley 185 is disposed at the other end of the rail 183. At least one of the pair of pulleys 184 and 185 is connected to a drive source such as a motor and is rotatable. A distance between the pair of pulleys 184 and 185 is set to be longer than a moving distance of the hand device 171 described above. More specifically, the distance between the pair of pulleys 184 and 185 is set at least such that the hand device 171 is movable from the pickup position R1 to the stacking position P.

The belt 186 extends along an extending direction (X-axis direction) of the rail 183 and is bridged between the pulley 184 and the pulley 185. Accordingly, the belt 186 is circularly driven along with the rotation of the pulley 184 and/or the pulley 185. Accordingly, one of portions of the belt 186 that are parallel to each other is driven along a conveying direction (X-axis direction) of the workpieces W1 and W2 from the separator supply device 102 toward the stacking device 105, and the other is driven in a direction opposite to the conveying direction. The belt 186 is, for example, a timing belt. Accordingly, the belt 186 can move the hand device 171 at a high speed. In the present embodiment, the moving unit 172 controls a position of the hand device 171 based on a rotation speed of the belt drive.

The connecting portion 187 connects the belt 186 and the hand device 171. The connecting portion 187 includes a base portion 188 and an arm portion 189. Here, the base portion 188 is engaged with the rail 183 to be movable along the rail 183, and is fixed to an upper portion of portions of the belt 186 parallel to each other. The arm portion 189 connects the base portion 188 and the hand device 171 via an alignment mechanism 174 to be described later. Accordingly, the hand device 171 can be moved along the rail 183 (along the X-axis direction) along with circulation drive of the belt 186.

The sensor 173 is provided in the stacking device 105. The sensor 173 detects a position of the workpiece W2 in a state of being conveyed above the stacking position P of the stacking device 105 and held by the hand device 171. More specifically, the sensor 173 detects an edge of the workpiece W2. In the present embodiment, the sensor 173 holds in advance a reference position serving as a reference of a position of the edge of the workpiece W2 at the stacking position P, and can detect deviation between the edge of the workpiece W2 held by the hand device 171 above the stacking position P and the reference position. More specifically, the sensor 173 can detect the deviation of the edge of the workpiece W2 from the reference position in the X-axis direction and the Y-axis direction. In addition, the sensor 173 can detect the deviation of the edge of the workpiece W2 from the reference position in a rotation direction (hereinafter, may be simply referred to as a "θ direction") around a rotation axis along the Z-axis.

In the present embodiment, the sensor 173 includes cameras 173*a*, 173*b*, and 173*c*, as an example. The cameras 173*a*, 173*b*, and 173*c* are provided to be separated from each other in the stacking device 105. Each of the cameras 173*a*, 173*b*, and 173*c* is provided to face upward (the positive side in the Z-axis direction). Accordingly, the cameras 173*a*, 173*b*, and 173*c* can image the workpiece W2 held above the stacking position P on the stacking device 105 from positions different from each other. The sensor 173 can detect the edge of the workpiece W2 based on images imaged by the cameras 173*a*, 173*b*, and 173*c*.

Figure 5:
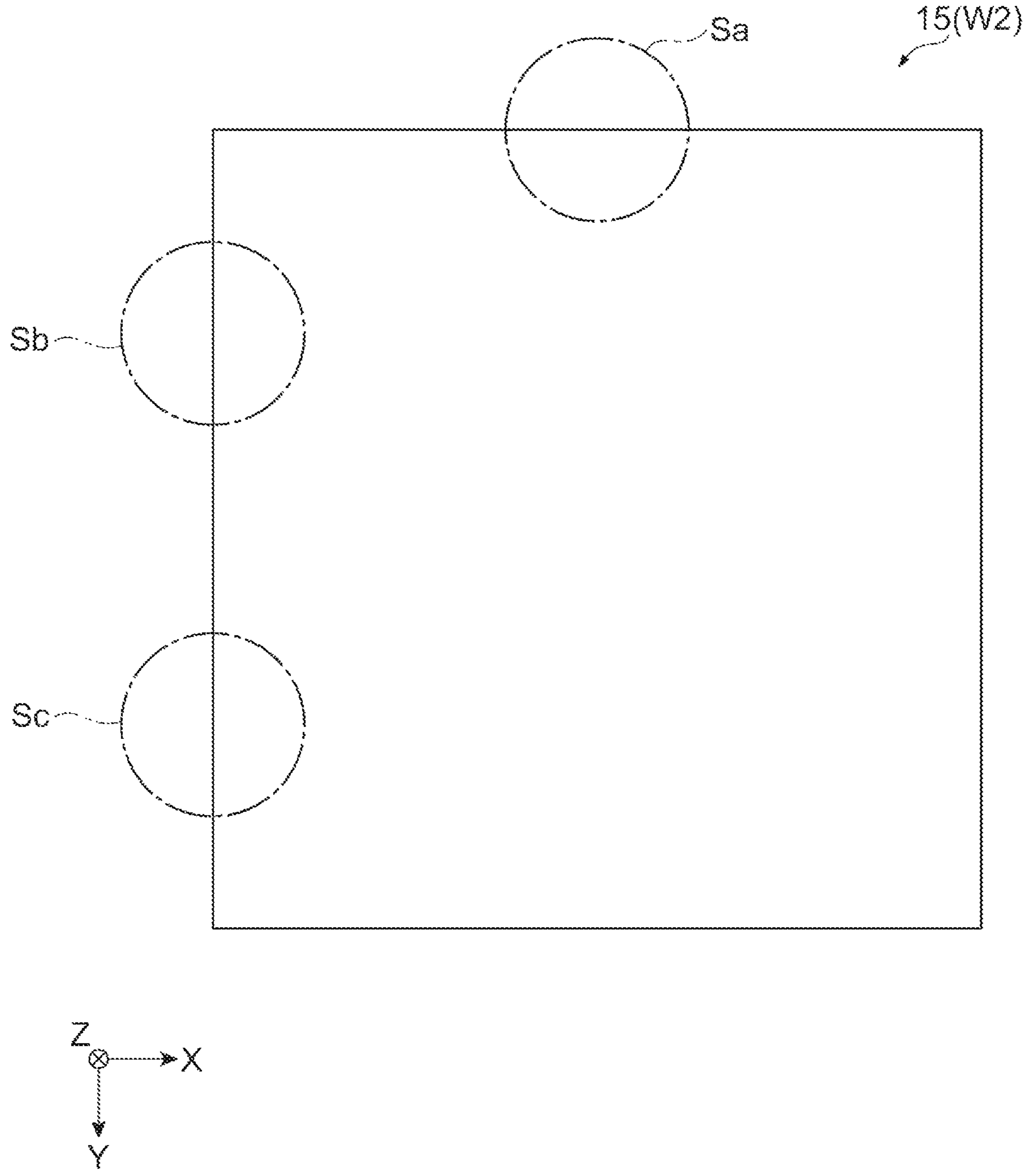
FIG. 5 is a schematic view illustrating detection ranges of the separator unit and a sensor held by a hand device.

FIG. 5 is a schematic view illustrating detection ranges of the separator unit 15 and the sensor 173 held by the hand device 171. FIG. 5 illustrates a scene in which the workpiece W2 in a state of being held above the stacking position P on the stacking device 105 is viewed from the stacking device 105 side. In the example of FIG. 5, a detection range Sa of the sensor 173 based on the image of the camera 173*a*, a detection range Sb of the sensor 173 based on the image of the camera 173*b*, and a detection range Sc of the sensor 173 based on the image of the camera 173*c* are illustrated by dashed dotted lines. As illustrated in FIG. 5, the sensor 173 detects an edge on a negative side in the Y-axis direction (upper side in FIG. 5) of two edges extending in the X-axis direction of the workpiece W2, and detects an edge on a negative side in the X-axis direction (left side in FIG. 5) of two edges extending in the Y-axis direction of the workpiece W2. The detection range Sb and the detection range Sc are separated from each other in the Y-axis direction. The detection range Sb is positioned on the negative side in the Y-axis direction with respect to the detection range Sc.

The sensor 173 detects the position of the edge of the workpiece W2 included in each of the detection ranges Sa, Sb, and Sc by image recognition. The reference position is set to correspond to each of the detection ranges Sa, Sb, and Sc. The sensor 173 can detect the deviation of the edge of the workpiece W2 from the reference position by comparing the position of the edge of the workpiece W2 detected in each of the detection ranges Sa, Sb, and Sc with each reference position. The sensor 173 can detect deviation of the workpiece W2 in a state of being held above the stacking position P of the stacking device 105 in the Y-axis direction with respect to the reference position by edge detection in the detection range Sa. In addition, the sensor 173 can detect deviation of the workpiece W2 in a state of being held above the stacking position P of the stacking device 105 in the X-axis direction with respect to the reference position by edge detection in at least one of the detection range Sb and the detection range Sc. Further, the sensor 173 can detect deviation of the workpiece W2 in a state of being held above the stacking position P of the stacking device 105 in the θ direction with respect to the reference position by using both the edge detections in the detection range Sb and the detection range Sc.

The alignment mechanism 174 is provided in the hand device 171. The alignment mechanism 174 is a mechanism that adjusts a relative position of the workpiece W2 in a state of being held by the hand device 171 with respect to the stacking device 105 based on the detection result of the sensor 173. The alignment mechanism 174 adjusts the relative position of the workpiece W2 by adjusting the position of the hand device 171 with respect to the stacking device 105. In the present embodiment, the alignment mechanism 174 is interposed between the vertical movement mechanism 182 of the hand device 171 and the arm portion 189 (moving unit 172) of the connecting portion 187. The alignment mechanism 174 adjusts the relative position of the workpiece W2 with respect to the stacking device 105 based on the position of the edge of the workpiece W2 detected by the sensor 173 such that the edge of the workpiece W2 held by the hand device 171 coincides with the reference position. More specifically, the relative position of the workpiece W2 is adjusted such that the edge of the workpiece W2 detected in each of the detection ranges Sa, Sb, and Sc of the sensor 173 coincides with the reference position in each of the detection ranges Sa, Sb, and Sc. Thus, the alignment mechanism 174 is configured to be able to move the hand device 171 independently in each of the X-axis direction, the Y-axis direction, and the θ direction.

Figure 6:
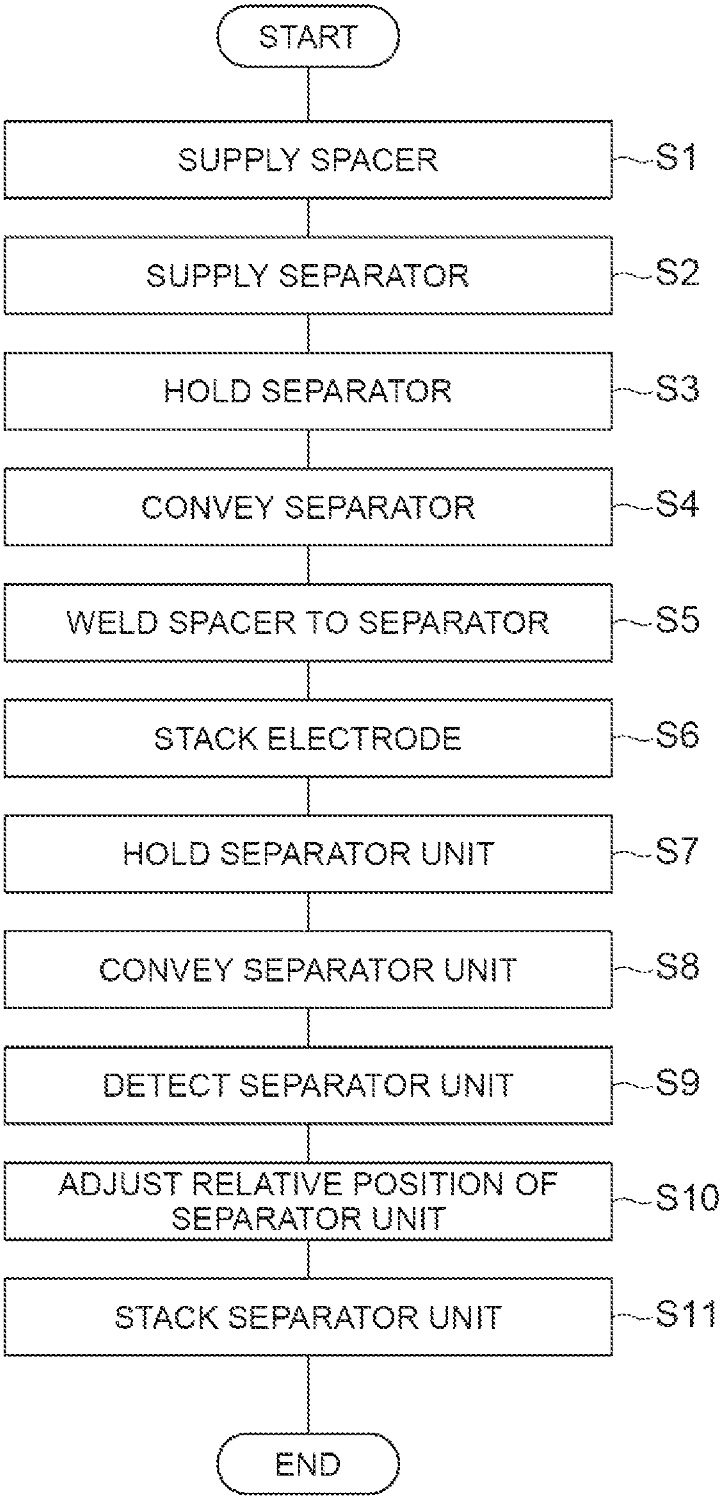
FIG. 6 is a flowchart illustrating an operation of the manufacturing device illustrated in FIG. 3.
Figure 7:
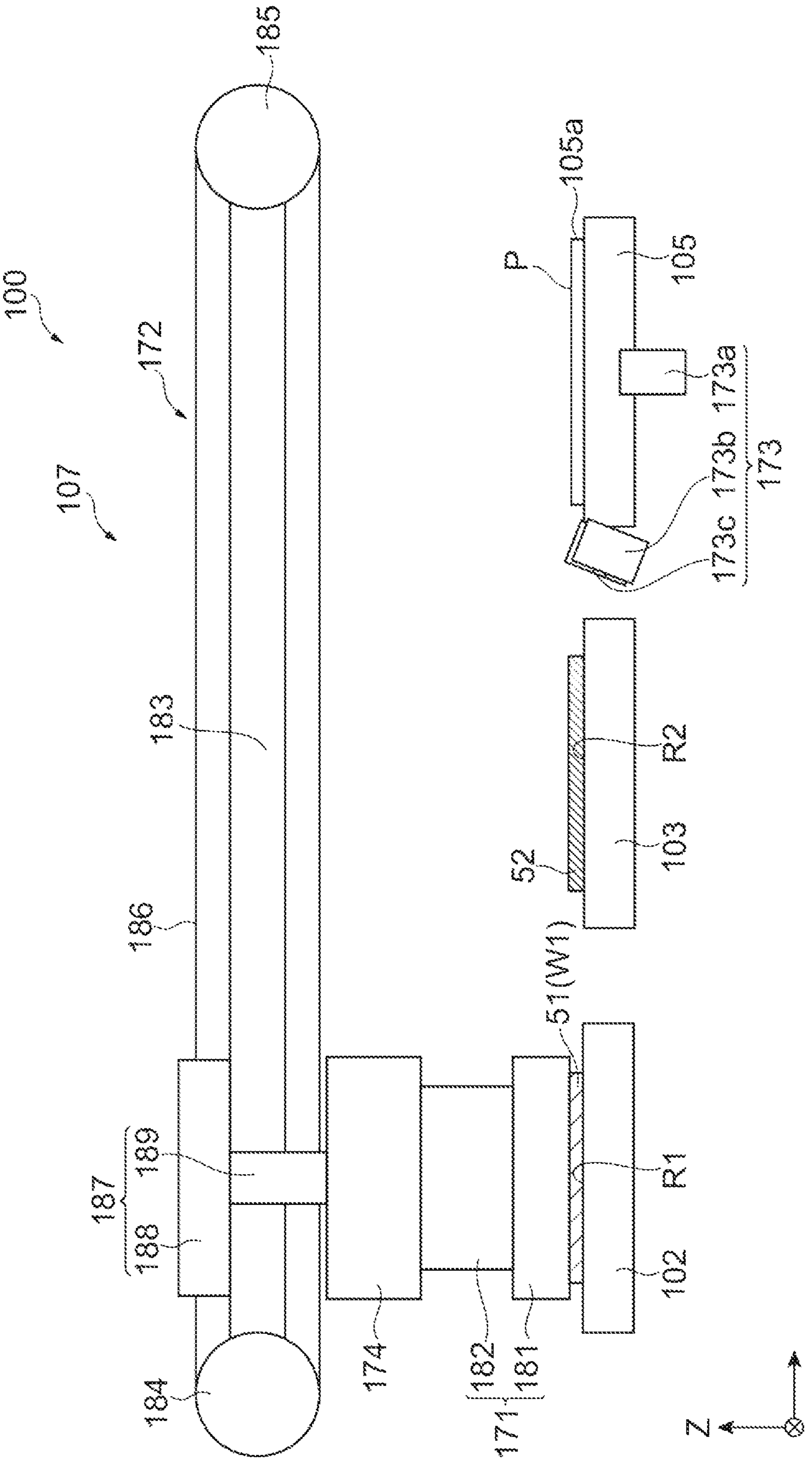
FIG. 7 is a schematic side view illustrating the operation of the manufacturing device illustrated in FIG. 3.

Subsequently, power storage module manufacturing method according to the present embodiment will be described. FIG. 6 is a flowchart illustrating a step of the power storage module manufacturing method according to the present embodiment. As illustrated in FIG. 6 and FIG. 7, in the power storage module manufacturing method according to the present embodiment, first, the spacer welding device 103 supplies the spacer 52 to the pickup position R2 (step S1). Subsequently, the separator supply device 102 supplies the separator 51 to the pickup position R1 (step S2).

Subsequently, the conveying device 107 picks up and holds, as the workpiece W1, the separator 51 held by the separator supply device 102 and supplied to the pickup position R1 in step S2 (step S3). More specifically, in step S3, first, the moving unit 172 of the conveying device 107 drives the belt 186 to move the hand device 171 from a predetermined standby position to above the pickup position R1. Subsequently, in step S3, the hand device 171 lowers the suction hand 181 toward the workpiece W1 by driving the vertical movement mechanism 182. Accordingly, the workpiece W1 is sucked by the suction hand 181. Then, in step S3, the hand device 171 raises the suction hand 181 in a state of sucking the workpiece W1 by driving the vertical movement mechanism 182. Accordingly, the workpiece W1 is picked up and sucked and held by the hand device 171. As described above, in step S3, the workpiece W1 is picked up and held by the hand device 171 in the separator supply device 102.

Figure 8:
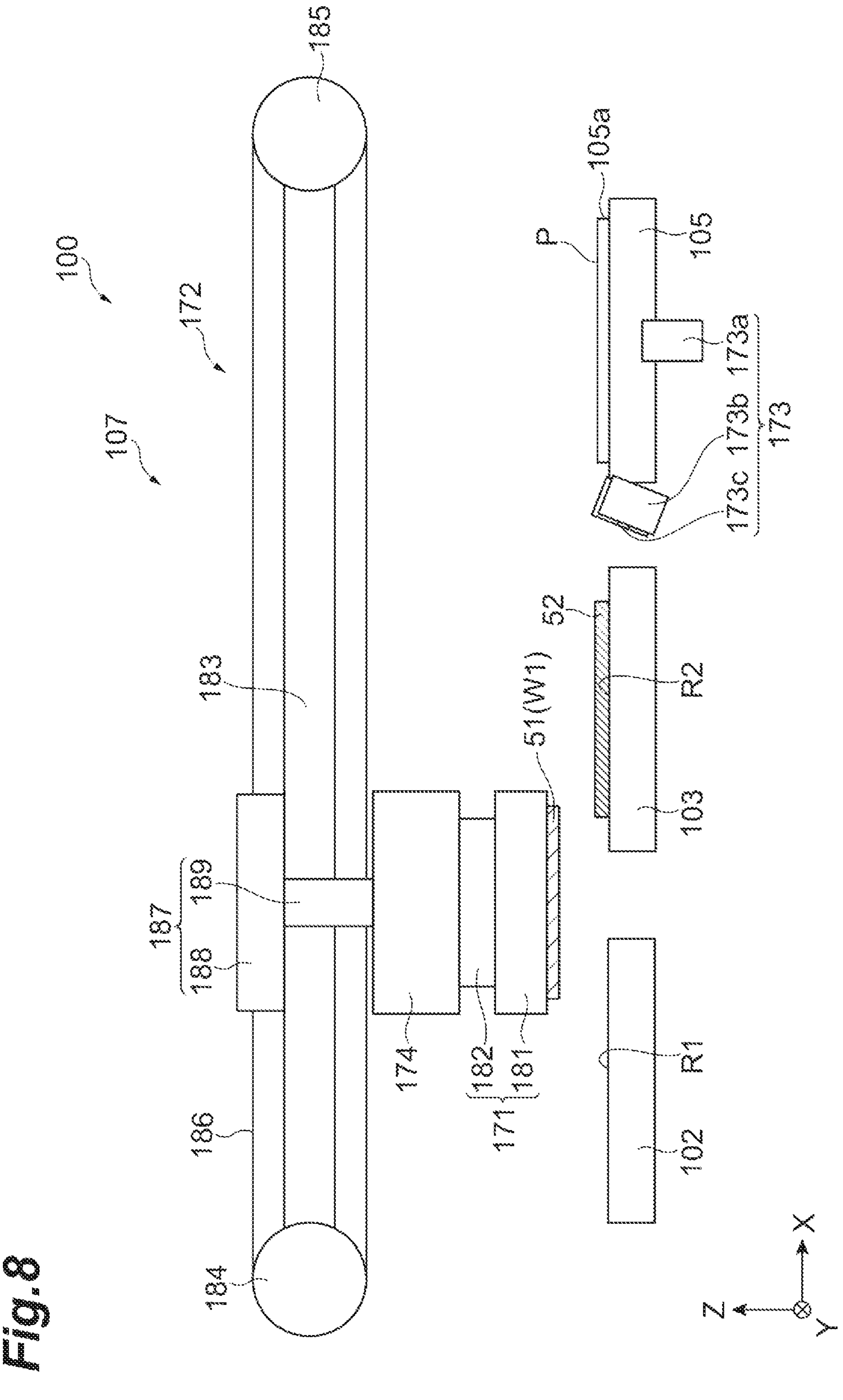
FIG. 8 is a schematic side view illustrating the operation of the manufacturing device illustrated in FIG. 3.

Subsequently, as illustrated in FIGS. 6 and 8, the moving unit 172 moves the hand device 171 in a state of holding the workpiece W1 in step S3 from the separator supply device 102 toward the spacer welding device 103 by driving the belt 186, and thus, the workpiece W1 is conveyed from the separator supply device 102 to above the pickup position R2 of the spacer welding device 103 (step S4). In step S4, the hand device 171 further lowers the suction hand 181 by driving the vertical movement mechanism 182 and releases the suction of the workpiece W1. Accordingly, as illustrated in FIG. 9, the workpiece W1 is disposed on the spacer 52 already supplied to the pickup position R2 in step S1.

Subsequently, in the spacer welding device 103, the separator 51 and the spacer 52 disposed on the spacer 52 in step S4 are welded by the welding portion (step S5). As an example, here, the separator 51 and the spacer 52 are temporarily welded, and the separator 51 and the spacer 52 are fixed to each other. Note that, the welding portion may be provided in the spacer welding device 103 or may be provided in the hand device 171. Accordingly, the separator unit 15 (workpiece W2) is formed at the pickup position R2 of the spacer welding device 103. Note that, a sensor may not be provided in the spacer welding device 103. In addition, when the workpiece W1 is disposed in step S4, the alignment mechanism 174 does not adjust the position of the workpiece W1. When the workpiece W1 is disposed, since the separator 51 may be disposed on the spacer 52 to cover at least the inner edge of the spacer 52, alignment accuracy of the workpiece W1 is not strictly required as compared with a case where the workpieces W2 for forming the sealing body 20 is stacked.

Subsequently, the electrode supply device 104 disposes the electrode unit at the stacking position P (step S6). Here, in the electrode supply device 104, the electrode unit 13 as a first stage is disposed on the stacking pallet 105*a*.

Figure 9:
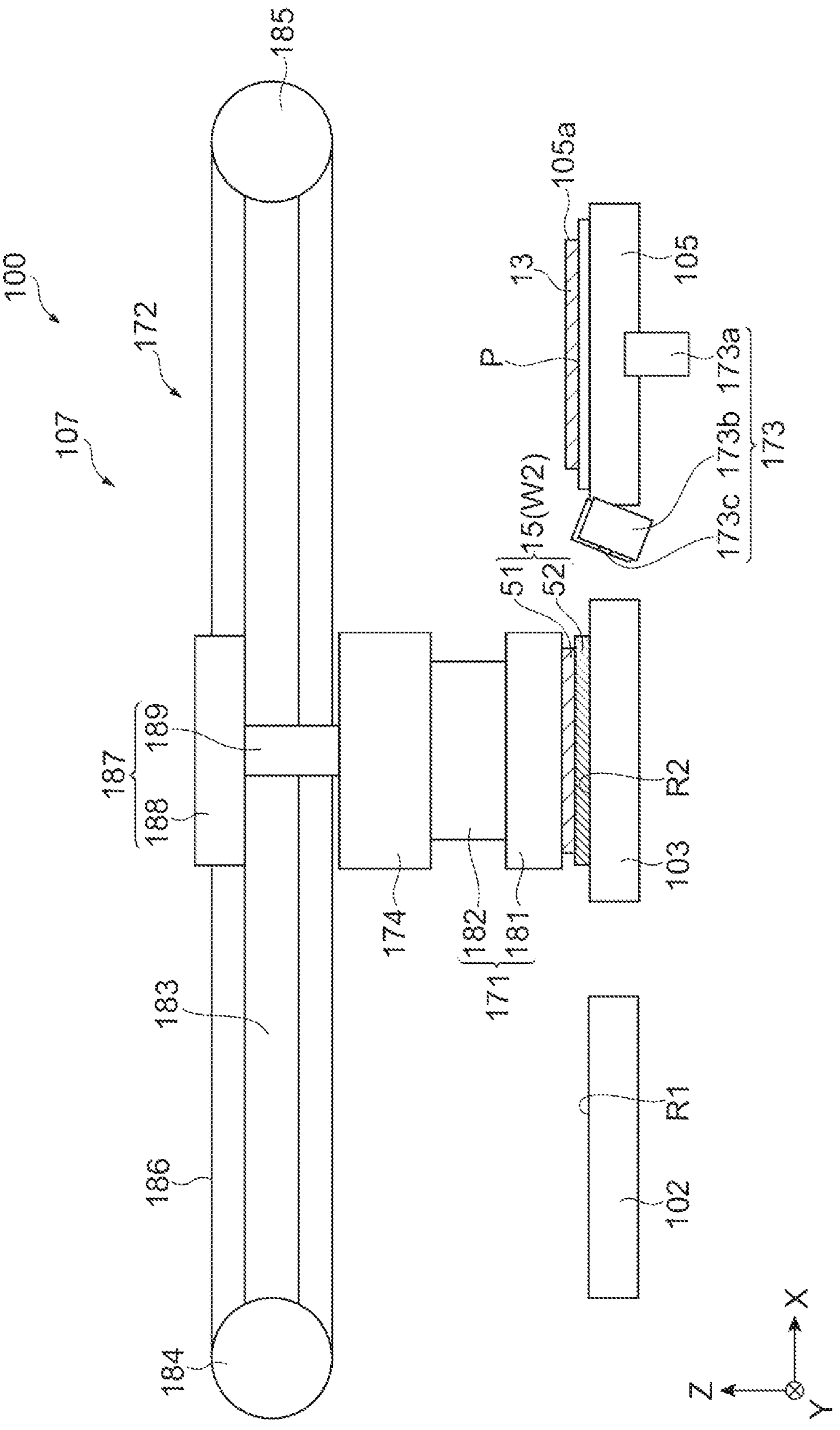
FIG. 9 is a schematic side view illustrating the operation of the manufacturing device illustrated in FIG. 3.

Subsequently, as illustrated in FIGS. 6 and 9, the hand device 171 picks up and holds the workpiece W2 at the pickup position R2 in the spacer welding device 103 (step S7 and first step). More specifically, the hand device 171 brings the suction hand 181 into contact with the workpiece W2 by driving the vertical movement mechanism 182. Accordingly, the suction hand 181 sucks the workpiece W2. Then, in step S7, the hand device 171 raises the suction hand 181 in a state of sucking the workpiece W2 by driving the vertical movement mechanism 182. Accordingly, the workpiece W2 is picked up and sucked and held by the hand device 171. As described above, in step S7, the workpiece W2 is picked up and held by the hand device 171 in the spacer welding device 103.

Figure 10:
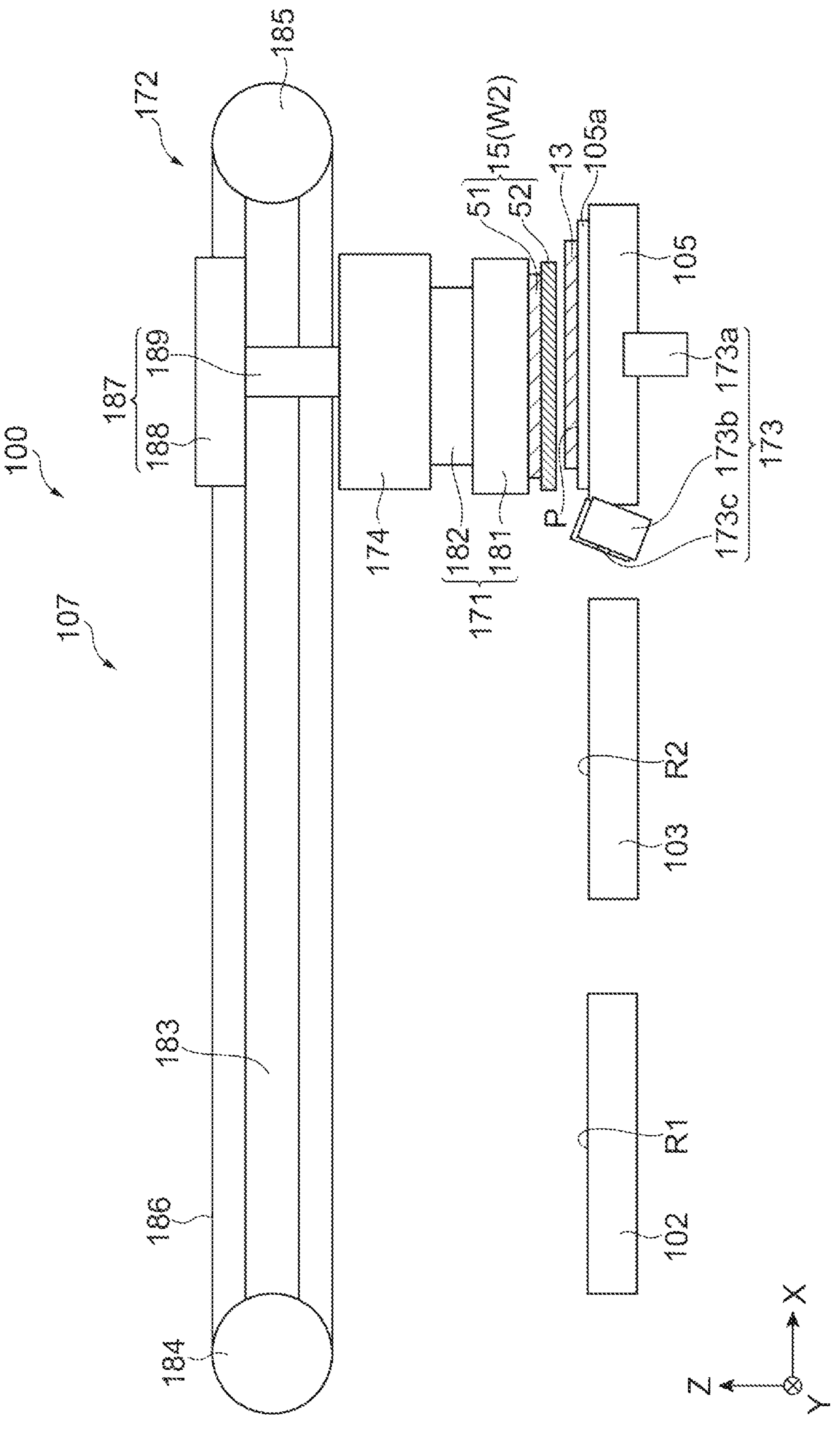
FIG. 10 is a schematic side view illustrating the operation of the manufacturing device illustrated in FIG. 3.

Subsequently, as illustrated in FIGS. 6 and 10, the moving unit 172 moves the hand device 171 in a state of holding the workpiece W2 in step S7 from the spacer welding device 103 toward the stacking device 105 by driving the belt 186, and thus, the workpiece W2 in a state of being held by the hand device 171 is conveyed from the spacer welding device 103 to the stacking position P on the stacking device 105 (step S8 and second step).

As described above, the power storage module manufacturing method includes a conveying step of conveying the workpiece W2, which is the component of the power storage module 1, from the spacer welding device 103 to the stacking device 105 that stacks the electrode unit, which is another component of the power storage module 1, and the plurality of workpieces W2 by using the conveying device 107 including the hand device 171 for holding the workpiece W2 and the moving unit 172 for moving the hand device 171.

In the example of FIG. 10, a state where the hand device 171 is stopped on the stacking device 105 is illustrated. In the present embodiment, the belt 186 is used to drive the hand device 171, and the moving unit 172 controls the position of the hand device 171 based on the rotation speed of the belt drive. Therefore, there is a possibility that variations occur in a stop position of the separator unit 15 held by the hand device 171 due to various factors such as tolerance of the resin constituting the belt 186, rattling of meshing of gears, and backlash. The example of FIG. 10 illustrates a state where the separator unit 15 is deviated in a negative direction in the X-axis direction with respect to the electrode unit 13 due to the influence of the variations in the stop position of the separator unit 15 held by the hand device 171.

Subsequently, the sensor 173 detects the position of the workpiece W2 in a state of being conveyed to above the stacking position P and held by the hand device 171 in step S8 (step S9 and third step). As described above, the sensor 173 detects the edge of the workpiece W2 based on the images imaged by the cameras 173*a*, 173*b*, and 173*c*. In the example of FIG. 10, the sensor 173 detects that the workpiece W2 held by the hand device 171 is deviated in the X-axis direction with respect to the reference position of the stacking device 105.

Figure 11:
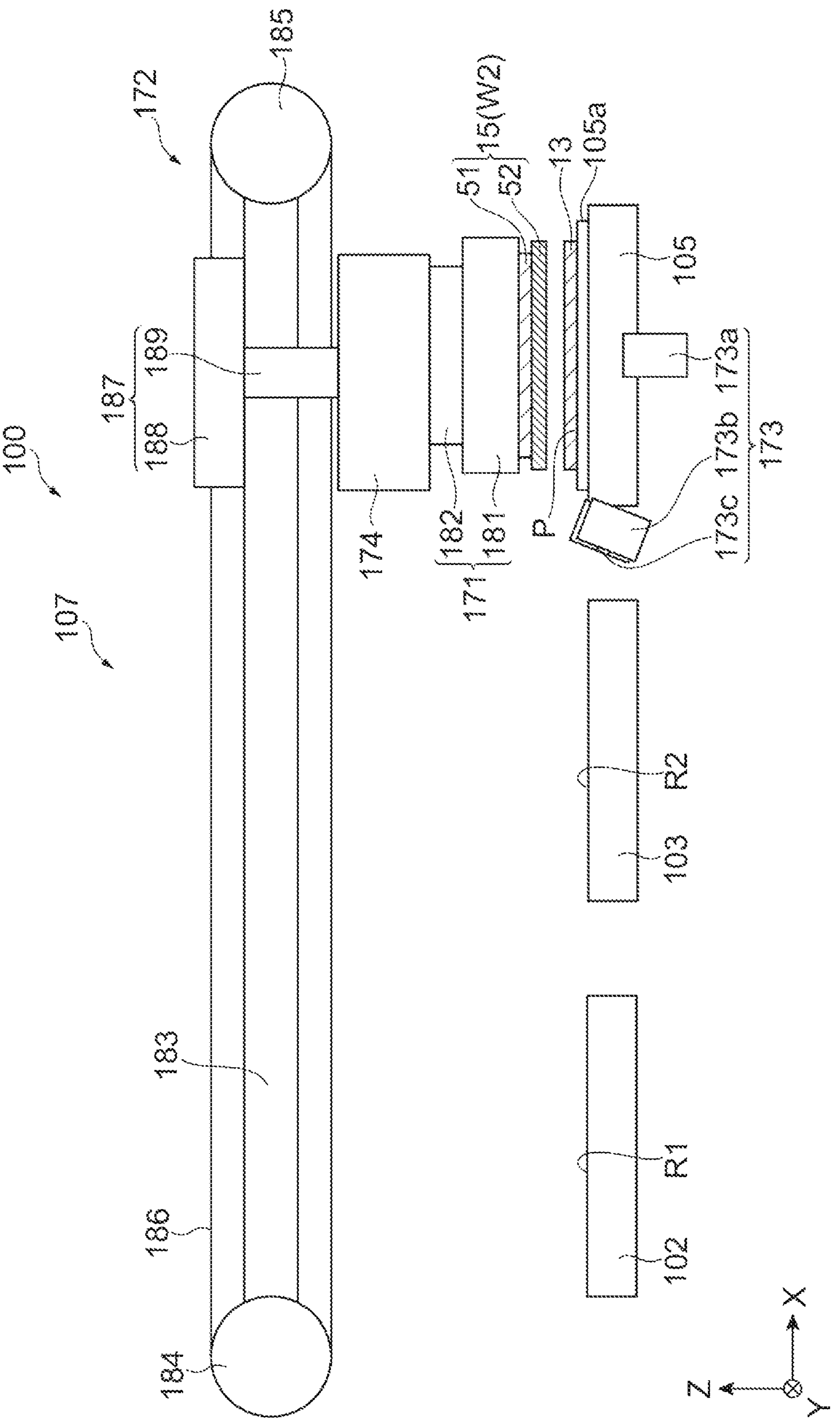
FIG. 11 is a schematic side view illustrating the operation of the manufacturing device illustrated in FIG. 3.

Subsequently, as illustrated in FIGS. 6 and 11, the alignment mechanism 174 adjusts the relative position of the workpiece W2 with respect to the stacking device 105 based on the position of the workpiece W2 detected by the sensor 173 (step S10 and fourth step). Here, the alignment mechanism 174 adjusts the relative position of the workpiece W2 held by the hand device 171 by adjusting the position of the hand device 171 with respect to the stacking device 105. More specifically, in step S10, the alignment mechanism 174 moves the hand device 171 in a state of holding the workpiece W2 and adjusts the relative position of the workpiece W2 such that the edge of the workpiece W2 detected by the sensor 173 coincides with the reference position. In the example of FIG. 11, a state where the alignment mechanism 174 adjusts the relative position of the workpiece W2 by moving the hand device 171 and the workpiece W2 along the X-axis direction is illustrated.

Figure 12:
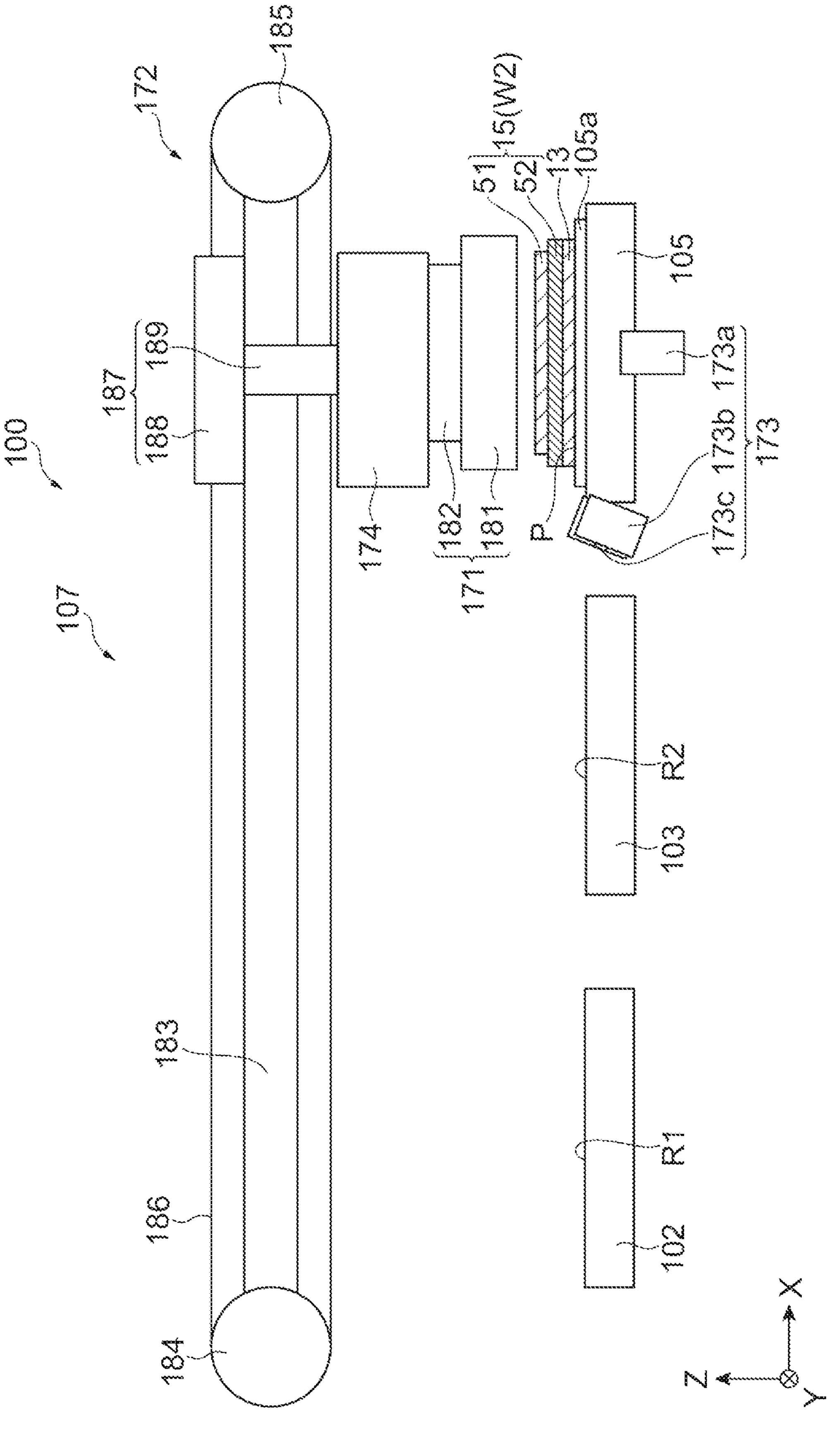
FIG. 12 is a schematic side view illustrating the operation of the manufacturing device illustrated in FIG. 3.

Subsequently, as illustrated in FIGS. 6 and 12, the hand device 171 stacks (disposes) the workpiece W2 on the electrode unit 13 by the stacking device 105 (step S11). In step S11, the workpiece W2 of which the relative position with respect to the stacking device 105 is adjusted is disposed in the stacking device 105 (fifth step). More specifically, in step S11, the hand device 171 drives the vertical movement mechanism 182 to lower the suction hand 181 and release the suction of the workpiece W2. Accordingly, in step S6, the workpiece W2 is stacked on the electrode unit 13 already disposed on the stacking pallet 105*a* at the stacking position P. Accordingly, the stacked body of the electrode unit 13 and the separator unit 15 is formed in the stacking device 105 (stacking pallet 105*a*). Steps S1 to S11 described above are repeated while the type of the electrode unit is changed at an appropriate timing, and thus, the stacked body 10 is formed on the stacking pallet 105*a* of the stacking device 105. Thereafter, the stacking device 105 takes out the stacked body 10 for each stacking pallet 105*a*. Accordingly, the stacked body 10 is supplied to the subsequent step.

In a step after the stacked body 10 is formed, as an example, the sealing members 22 and the spacers 52 are melted by non-contact heating. The sealing members 22 and the spacers 52 are melted by being irradiated with infrared rays by using, for example, an infrared heater. Accordingly, the sealing members 22 and the spacers 52 are integrated by being melted and welded to each other, and thus, the sealing body 20 is formed.

Subsequently, an electrolyte solution is injected into the housing space S. The injection is performed, for example, through a communication hole (not illustrated) provided in the sealing body 20. Thereafter, the plurality of housing spaces S and the electrolyte disposed within the housing space S are sealed by sealing the communication hole. Through the above steps, the power storage module 1 is manufactured (the power storage module manufacturing method is ended).

Subsequently, effects of the device 100 for manufacturing a power storage module and the power storage module manufacturing method according to the present embodiment will be described.

In the device 100 for manufacturing a power storage module according to the present embodiment, the workpiece W2 which is the component of the power storage module 1 is conveyed by moving the hand device 171 in a state of holding the workpiece W2 from the spacer welding device 103 to the stacking position P on the stacking device 105 that stacks the electrode unit which is another component of the power storage module 1 and the plurality of workpieces W2. On the other hand, in the device 100 for manufacturing a power storage module, the workpiece W2 in a state of being conveyed to above the stacking position P and held by the hand device 171 is detected by using the sensor 173. Then, based on the detection result of the sensor 173, the relative position of the workpiece W2 in a state of being held by the hand device 171 with respect to the stacking device 105 is adjusted, and the workpiece W2 of which the relative position with respect to the stacking device 105 is adjusted by the alignment mechanism 174 is disposed in the stacking device 105. Therefore, positional deviation of the workpiece W2 at the stacking position P is suppressed. In addition, in the device 100 for manufacturing a power storage module according to the present embodiment, the sensor 173 which detects the workpiece W2 is provided in the stacking device 105. In a case where the sensor 173 is provided in the hand device 171, a weight of the hand device 171 increases. Therefore, it is necessary to prepare the moving unit 172 capable of driving a heavy object, and there is a concern that the device 100 for manufacturing a power storage module becomes large in size. In addition, the weight of the hand device 171 is increased, and thus, inertia at the time of stopping the hand device 171 increases. Backlash is generated, and thus, there is a possibility that the positional deviation of the workpiece W2 at the stacking position P occurs. In this respect, in the device 100 for manufacturing a power storage module and the power storage module manufacturing method according to the present embodiment, since the sensor 173 is provided in the stacking device 105, the weight of the hand device 171 can be reduced, and the positional deviation of the workpiece W2 at the stacking position P can be suppressed.

In the device 100 for manufacturing a power storage module according to the present embodiment, the moving unit 172 includes the belt 186 driven along the conveying direction from the spacer welding device 103 toward the stacking device 105, and the hand device 171 is moved from the spacer welding device 103 toward the stacking device 105 by driving the belt 186. In this case, the hand device 171 can be moved from the spacer welding device 103 toward the stacking device 105 by driving the belt 186. As described above, since a drive unit is not provided in the hand device 171 by using the belt 186 in the driving of the hand device 171, it is possible to further reduce the weight of the hand device 171 and move the hand device 171 at a high speed.

In the device 100 for manufacturing a power storage module according to the present embodiment, the alignment mechanism 174 adjusts the relative position of the workpiece W2 by adjusting the position of the hand device 171 with respect to the stacking device 105. In a case where the alignment mechanism 174 adjusts the position of the stacking device 105 with respect to the hand device 171, the alignment mechanism 174 may need to drive a large number of workpieces W2 already stacked and the stacking pallet 105*a* of the stacking device 105 for each electrode unit. Therefore, it is necessary to prepare the alignment mechanism 174 capable of driving the heavy object, and there is a concern that the device is increased in size. On the other hand, in a case where the alignment mechanism 174 adjusts the position of the hand device 171 with respect to the stacking device 105, since the alignment mechanism 174 is provided on the hand device 171 side and the alignment mechanism 174 may drive a relatively lightweight object such as one workpiece W2 and the hand device 171, the increase in size of the device can be avoided.

In the device 100 for manufacturing a power storage module according to the present embodiment, the sensor 173 detects the edge of the workpiece W2, and the alignment mechanism 174 adjusts the relative position of the workpiece W2 such that the edge of the workpiece W2 detected by the sensor 173 coincides with the reference position. In this case, the positional deviation of the workpiece W2 at the stacking position P can be reliably suppressed by using the edge of the workpiece W2 detected by the sensor 173.

In the power storage module manufacturing method according to the present embodiment, the workpiece W2 which is the component of the power storage module 1 is conveyed from the spacer welding device 103 to the stacking position P on the stacking device 105 that stacks the electrode unit which is another component of the power storage module 1 and the plurality of workpieces W2 in a state where the workpiece W2 is held. In the power storage module manufacturing method, the workpiece W2 in a state of being conveyed to and held at the stacking position P is detected. Then, based on the detected position of the workpiece W2, the relative position of the workpiece W2 in a state of being held with respect to the stacking device 105 is adjusted, and the workpiece W2 of which the relative position with respect to the stacking device 105 is adjusted is disposed in the stacking device 105. Therefore, positional deviation of the workpiece W2 at the stacking position P is suppressed.

The above embodiment describes an aspect of the present disclosure, and the present disclosure can be modified without being limited to the above example.

Figure 13:
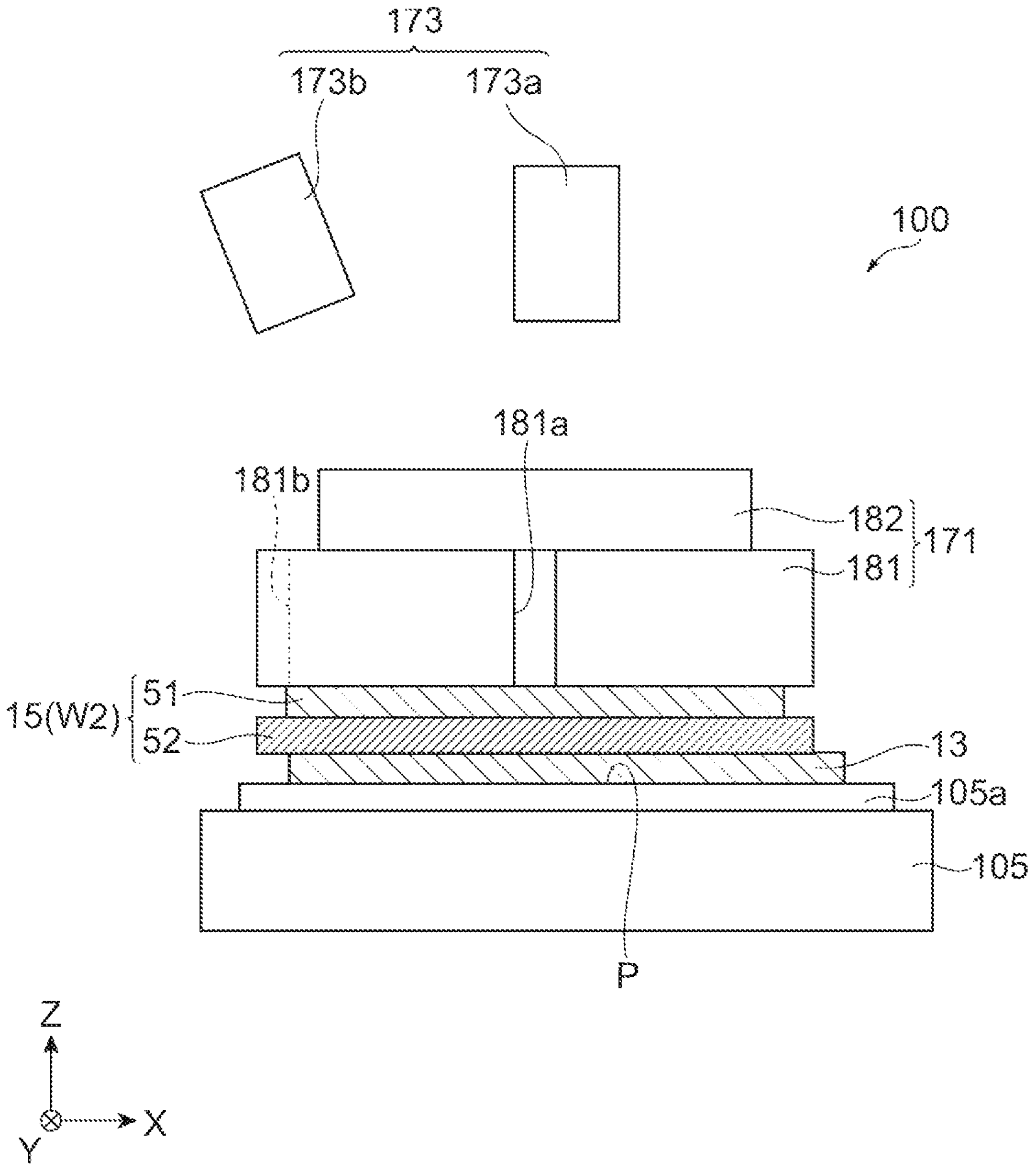
FIG. 13 is a schematic side view illustrating an operation of power storage module manufacturing device according to a modification.

FIG. 13 is a schematic side view illustrating an operation of a device 100 for manufacturing a power storage module according to a modification. Hereinafter, differences from the above embodiment will be mainly described, and redundant description will be omitted as appropriate. First, a configuration of the device 100 for manufacturing a power storage module according to the modification will be described.

As illustrated in FIG. 13, in the device 100 for manufacturing a power storage module, the sensor 173 is provided above the stacking position P of the stacking device 105. The sensor 173 includes the cameras 173*a* and 173*b*, as an example. The cameras 173*a* and 173*b* are separated from each other and are provided to face downward (negative side in the Z-axis direction).

As an example, cutout portions 181*a* and 181*b* are provided in the suction hand 181 by cutting out end portions in plan view. The cutout portion 181*a* is provided at a position overlapping the workpiece W2 in a state where the suction hand 181 holds the workpiece W2, that is, at an end portion of the suction hand 181 in the Y direction. The cutout portion 181*a* is provided at a position facing the camera 173*a* in the Z-axis direction. The cutout portion 181*b* is provided at a position overlapping the workpiece W2 in a state where the suction hand 181 holds the workpiece W2, that is, at an end portion of the suction hand 181 in the X direction. The cutout portions 181*a* and 181*b* are provided, for example, at positions overlapping the edge of the workpiece W2. The cutout portion 181*b* is provided at a position facing the camera 173*b* in the Z-axis direction. Note that, positions where the cutout portions 181*a* and 181*b* are provided may be any positions corresponding to the positions of the cameras 173*a* and 173*b*, and can be changed as appropriate.

Each of the cutout portions 181*a* and 181*b* extends from one end (an upper side of a drawing sheet in FIG. 13) to the other end (a lower side of the drawing sheet in FIG. 13) of the suction hand 181 in the Z-axis direction. Thus, in a state where the workpiece W2 is held by the hand device 171, the workpiece W2 (for example, the edge of the workpiece W2) can be visually recognized through each of the cutout portions 181*a* and 181*b* in plan view. The camera 173*a* images the workpiece W2 through the cutout portion 181*a*. In addition, the camera 173*b* images the workpiece W2 through the cutout portion 181*b*. The cameras 173*a* and 173*b* image the images of the edge of the workpiece W2, for example. The sensor 173 detects the workpiece W2 based on the images imaged by the cameras 173*a* and 173*b*. The sensor 173 detects, for example, the edge of the workpiece W2.

Subsequently, power storage module manufacturing method according to the modification will be described. In the example of FIG. 13, an operation of the device 100 for manufacturing a power storage module executed after step S8 and before step S9 is illustrated.

In the above embodiment, the aspect in which the sensor 173 detects the position of the workpiece W2 in a state of being conveyed above the stacked position P and held by the hand device 171 from below the workpiece W2 in step S9 after step S8 is executed has been illustrated. However, in the present modification, first, after step S8 and before step S9, the workpiece W2 is pressed against the stacking device 105 (here, the electrode unit 13 on the stacking device 105) in a state where the hand device 171 holds the workpiece W2 (pressing step). Specifically, the hand device 171 brings the workpiece W2 into contact with the electrode unit 13 by lowering the suction hand 181 by the vertical movement mechanism 182 while continuing the holding of the workpiece W2 by the suction hand 181.

Then, step S9 is executed while the holding of the workpiece W2 by the hand device 171 is continued. In step S9, the sensor 173 detects the workpiece W2 in a state of being pressed against the electrode unit 13 on the stacking device 105. At this time, the sensor 173 detects the edge of the workpiece W2 based on the image imaged by the camera 173*a* through the cutout portion 181*a* from above the workpiece W2. In addition, the sensor 173 detects the edge of the workpiece W2 based on the image imaged by the camera 173*b* through the cutout portion 181*b* from above the workpiece W2. In the example of FIG. 13, the sensor 173 detects that the workpiece W2 held by the hand device 171 is deviated in the X-axis direction with respect to the reference position of the stacking device 105.

Subsequently, before step S10, the hand device 171 separates the workpiece W2 from the electrode unit 13. Specifically, the hand device 171 raises the suction hand 181 by driving the vertical movement mechanism 182 while continuing the holding of the workpiece W2 by the suction hand 181. Then, similarly to the above embodiment, step S10 is executed. Hereinafter, the power storage module 1 is manufactured through steps similar to the steps in the above embodiment.

In the device 100 for manufacturing a power storage module according to the present modification, the hand device 171 presses the workpiece W2 against the stacking device 105 in a state of holding the workpiece W2, and the sensor 173 detects the workpiece W2 pressed against the stacking device 105. As described above, the relative position of the workpiece W2 with respect to the stacking device 105 can be more accurately detected by detecting the workpiece W2 held by the hand device 171 and pressed against the stacking device 105 to be extended in warpage.

The power storage module manufacturing method according to the present modification further includes a step of pressing the workpiece W2 in a state of being held against the stacking device 105 after the second step and before the third step, and in the third step, the workpiece W2 in a state of being pressed against the stacking device 105 is detected. As described above, the relative position of the workpiece W2 with respect to the stacking device 105 can be more accurately detected by detecting the workpiece W2 held and pressed against the stacking device 105 to be extended in warpage.

In the above modification, the cutout portions 181*a* and 181*b* may not be provided in the suction hand 181. The sensor 173 may be provided at a position where the workpiece W2 (for example, the edge of the workpiece W2) held by the hand device 171 can be detected. For example, the cameras 173*a* and 173*b* constituting the sensor 173 may be provided at positions (that is, positions where the workpiece W2 is looked down from obliquely above) deviated from the suction hand 181 moved above the stacking position P of the stacking device 105 in plan view.

The above modification and the above embodiment may be appropriately combined. For example, in the above embodiment, after step S8 and before step S9, a step of pressing the workpiece W2 against the stacking device 105 in a state where the hand device 171 holds the workpiece W2 may be executed. Then, step S9 may be executed while the holding of the workpiece W2 by the hand device 171 is continued. In this case, the workpiece W2 in a state of being pressed against the electrode unit 13 on the stacking device 105 is detected by the sensor 173 from below.

In the above embodiment, the aspect in which the alignment mechanism 174 is provided in the hand device 171 has been illustrated. However, the alignment mechanism 174 may be provided in the stacking device 105. In this case, the alignment mechanism 174 can adjust the relative position of the workpiece W2 with respect to the stacking device 105 by driving a stage on which the workpiece W2 of the stacking device 105 and the electrode unit are stacked based on the detection result of the sensor 173. In this case, when the stacking of the workpiece W2 and the electrode unit is repeated while the relative position of the workpiece W2 is adjusted by driving the stage, the stage may be deviated from an initial position when the stacked body 10 is formed on the stacking pallet 105*a*. Therefore, the alignment mechanism 174 may perform an operation of moving the stage to return the stage to the initial position when next stacking is started (when a new stacking pallet 105*a* is supplied).

In addition, the device 100 for manufacturing a power storage module may include a sensor which detects the position of the separator 51 supplied to the pickup position R1 of the separator supply device 102 and the position of the spacer 52 supplied to the pickup position R2 of the spacer welding device 103. In this case, when the separator 51 and the spacer 52 supplied to the pickup position R1 and the pickup position R2 are picked up by the hand device 171, the device 100 for manufacturing a power storage module may execute an operation of detecting the positions of the separator 51 and the spacer 52 by using the sensor. In addition, the device 100 for manufacturing a power storage module may execute an operation of adjusting the position of the hand device 171 by the alignment mechanism 174 based on the positions of the separator 51 and the spacer 52 detected by the sensor. In this case, it is possible to more accurately pick up the separator 51 and the spacer 52 by the hand device 171.

In addition, the device 100 for manufacturing a power storage module may execute an operation of adjusting the relative position between the workpiece W1 in a state of being held on the spacer welding device 103 and the spacer welding device 103. More specifically, a sensor for detecting the workpiece W1 in a state of being conveyed to the pickup position R2 and held on the spacer welding device 103 may be provided in the spacer welding device 103. In addition, the alignment mechanism 174 provided in the hand device 171 may adjust the relative position of the workpiece W1 with respect to the spacer welding device 103 based on the detection result of the sensor. In this case, when the separator 51 is stacked on the spacer 52 on the spacer welding device 103, the positional deviation of the workpiece W1 at the pickup position R2 can be suppressed.

In addition, in the above embodiment, the aspect in which the workpiece W2 is conveyed from the spacer welding device 103 (first device) which holds the workpiece W2 which is the component of the power storage module 1 to the stacking device 105 (second device) which stacks the electrode unit which is another component of the power storage module 1 and the workpiece W2 has been illustrated. However, when the supply of the spacer 52 and the welding of the spacer 52 to the separator 51 are realized by the stacking device 105 as an example, the device 100 for manufacturing a power storage module may not include the spacer welding device 103. In this case, the device 100 for manufacturing a power storage module may convey the workpiece W1 from the separator supply device 102 (first device) which holds the workpiece W1 to the stacking device 105 (second device).

In addition, in the above embodiment, the aspect in which the hand device 171 stacks the workpiece W2 which is the separator unit 15 on the electrode unit 13 has been illustrated. However, the hand device 171 may stack the workpiece W2 which is the spacer 52 on the electrode unit 13. In this case, the hand device 171 may subsequently stack the separator 51 on the spacer 52 and the electrode unit 13. In addition, in step S6, the electrode supply device 104 may dispose the electrode unit 14 as the first stage on the stacking pallet 105*a*. In this case, the hand device 171 may stack the workpiece W2 which is the separator 51 on the electrode unit 14. Then, after the separator 51 (workpiece W2) is stacked on the electrode unit 14, the separator 51 may be welded to the sealing member 22 included in the electrode unit 14, and then the hand device 171 may stack the spacer 52 on the separator 51 and the electrode unit 14.

In addition, in the above embodiment, the aspect in which the workpiece W2 is disposed on the electrode unit which is another component of the power storage module 1 in the stacking device 105 has been illustrated. However, the conveying device 107 may be configured to convey and stack not only the workpiece W1 and the workpiece W2 but also the electrode unit to the stacking device 105.

In addition, when the workpiece W1 is conveyed to the pickup position R2, the conveying device 107 may lower the suction hand 181 holding the workpiece W1 and dispose the workpiece W1 at the pickup position R2 without releasing the suction. In this case, the spacer 52 is welded to the separator 51 in a state of being held by the suction hand 181 to form the workpiece W2. In addition, the conveying device 107 holds (picks up) the workpiece W2 in a state of sucking the separator 51.

The hand device 171 and the moving unit 172 are not limited to the device and unit described above. The hand device 171 and the moving unit 172 may include another conveying device (as an example, robot hand).

REFERENCE SIGNS LIST

- 1 power storage module
- 12, 13, 14 electrode unit (electrode)
- 100 power storage module manufacturing device
- 103 spacer welding device (first device)
- 105 stacking device (second device)
- 107 conveying device
- 171 hand device (hand unit)
- 172 moving unit
- 173 sensor
- 174 alignment mechanism (adjustment mechanism)
- 186 belt
- 187 connecting portion
- P stacking position
- W1, W2 workpiece

The invention claimed is:

1. Power storage module manufacturing device, comprising:

a conveying device configured to convey a workpiece that is a component of a power storage module from a first device to a second device configured to stack a plurality of the workpieces;

a sensor configured to detect the workpiece; and an adjustment mechanism configured to adjust a relative position of the workpiece, wherein the conveying device includes a hand unit configured to pick up and hold the workpiece, and a moving unit configured to covey the workpiece from the first device to a stacking position on the second device by moving the hand unit in a state of holding the workpiece from the first device toward the second device, the sensor is provided in the second device to detect the workpiece in a state of being conveyed to the stacking position and held by the hand unit, the adjustment mechanism is configured to adjust a relative position of the workpiece in a state of being held by the hand unit with respect to the second device based on a detection result of the sensor, and the hand unit is configured to dispose the workpiece of which the relative position with respect to the second device is adjusted by the adjustment mechanism in the second device.

2. Power storage module manufacturing device according to claim 1, wherein the moving unit includes a belt driven along a conveying direction from the first device toward the second device, and moves the hand unit from the first device toward the second device by driving the belt.

3. Power storage module manufacturing device according to claim 1, wherein the adjustment mechanism is configured to adjust the relative position of the workpiece by adjusting a position of the hand unit with respect to the second device.

4. Power storage module manufacturing device according to claim 1, wherein the sensor is configured to detect an edge of the workpiece, and the adjustment mechanism is configured to adjust the relative position of the workpiece such that the edge of the workpiece detected by the sensor coincides with a reference position.

5. Power storage module manufacturing device according to claim 1, wherein the hand unit is configured to press the workpiece against the second device in a state of holding the workpiece, and the sensor is configured to detect the workpiece in a state of being pressed against the second device.

6. Power storage module manufacturing method, comprising:

a conveying step of conveying a workpiece that is a component of a power storage module from a first device toward a second device configured to stack a plurality of the workpieces, wherein the conveying step includes:

a first step of picking up and holding the workpiece;

a second step of conveying the workpiece in a state of being held from the first device to a stacking position on the second device after the first step;

a third step of detecting a position of the workpiece in a state of being conveyed to the stacking position and held after the second step;

a fourth step of adjusting a relative position of the workpiece with respect to the second device based on the detected position of the workpiece after the third step; and a fifth step of disposing the workpiece of which the relative position with respect to the second device is adjusted in the second device after the fourth step.

7. Power storage module manufacturing method according to claim 6, further comprising:

a step of pressing the workpiece in a state of being held against the second device after the second step and before the third step, wherein in the third step, the workpiece in a state of being pressed against the second device is detected.

* * * * *